(12) United States Patent
Li et al.

(10) Patent No.: US 11,677,346 B2
(45) Date of Patent: Jun. 13, 2023

(54) METHOD OF OPERATING A SYNCHRONOUS MOTOR IN A FLUX WEAKENING MODE AND A CONTROLLER THEREFOR

(71) Applicant: Kinetic Technologies International Holdings LP, Toronto (CA)

(72) Inventors: Kwei Chung Li, Kowloon (HK); Feng Zhu, Wanchai (HK)

(73) Assignee: Kinetic Technologies International Holdings LP, Toronto (CA)

( * ) Notice: Subject to any disclaimer, the term of this patent is extended or adjusted under 35 U.S.C. 154(b) by 0 days.

(21) Appl. No.: 17/462,885

(22) Filed: Aug. 31, 2021

(65) Prior Publication Data

US 2023/0060458 A1    Mar. 2, 2023

(51) Int. Cl.
*H02P 21/00* (2016.01)
*H02P 21/22* (2016.01)
*H02P 21/18* (2016.01)

(52) U.S. Cl.
CPC .......... *H02P 21/0089* (2013.01); *H02P 21/18* (2016.02); *H02P 21/22* (2016.02); *H02P 2207/05* (2013.01)

(58) Field of Classification Search
CPC ...... H02P 21/0089; H02P 21/18; H02P 21/22; H02P 2207/05
See application file for complete search history.

(56) References Cited

U.S. PATENT DOCUMENTS

| | | | |
|---|---|---|---|
| 2009/0284195 A1 | 11/2009 | Gallegos-Lopez et al. | |
| 2013/0020971 A1* | 1/2013 | Gallegos-Lopez | H02P 21/0089 |
| | | | 318/400.02 |

(Continued)

FOREIGN PATENT DOCUMENTS

| CN | 101969289 A | 2/2011 |
|---|---|---|
| CN | 102882457 A | 1/2013 |

(Continued)

OTHER PUBLICATIONS

Dongyun Lu, "A Review of Flux-weakening Control in Permanent Magnet Synchronous Machines", Department of Electrical & Computer Engineering, University of Windsor, Windsor, ON.

(Continued)

*Primary Examiner* — Cortez M Cook
(74) *Attorney, Agent, or Firm* — Sheppard Mullin Richter & Hampton LLP

(57) ABSTRACT

Described is a method of controlling operation of a synchronous motor. The method comprises, during constant power/speed motor operation, determining a value of a stator voltage ($v_s^2$) for an orthogonal rotating reference frame of the motor. Comparing the value of the determined stator voltage ($v_s^2$) to a threshold voltage ($v_{s\_max1}^2$), said threshold voltage ($v_{s\_max1}^2$) having a value between that of a maximum stator voltage ($v_{s\_max0}^2$) for a basic speed mode of operation of the motor and that of a maximum stator voltage ($v_{s\_max2}^2$) of the motor closed loop controller. If the determined value of the stator voltage ($v_s^2$) is greater than or equal to the value of the threshold voltage ($v_{s\_max1}^2$), then controlling operation of the motor in a flux weakening mode of operation until a value of a current component ($i_d - \Delta i_d$) in a d-axis reaches a maximum negative value ($-i_{dmax}$), or until (Continued)

the value of the stator voltage ($v_s^2$) is less than the value of the threshold voltage ($v_{s\_max1}^2$).

19 Claims, 12 Drawing Sheets

(56) References Cited

U.S. PATENT DOCUMENTS

| | | | |
|---|---|---|---|
| 2014/0312812 A1* | 10/2014 | Sasaki | H02P 21/0089 |
| | | | 318/400.02 |
| 2016/0268950 A1 | 9/2016 | Cho et al. | |
| 2018/0167015 A1 | 6/2018 | Wu | |

FOREIGN PATENT DOCUMENTS

| | | |
|---|---|---|
| CN | 105680748 A | 6/2016 |
| CN | 106788041 B | 11/2018 |
| CN | 107248830 B | 4/2019 |
| CN | 208782747 U | 4/2019 |
| CN | 107086836 B | 6/2019 |
| JP | 5212697 B2 | 6/2013 |
| TW | 201130217 A | 9/2011 |

OTHER PUBLICATIONS

"Sensorless PMSM Field-Oriented Control" DRM148, Freescale Semiconductor Inc., 2016.

Zambada, Jorge, "Sensorless Field Oriented Control of PMSM Motors", AN1078, Microchip Technology Inc., 2007.

PCT International Search Report and the Written Opinion dated Oct. 10, 2022, issued in related International Application No. PCT/CN2022/106536 (9 pages).

Search Report dated Mar. 28, 2023, issued in related Taiwan Application No. 111130668 (3 pages).

* cited by examiner

| | hw_speed | Target_id |
|---|---|---|
| 0 | 9000 | -0.05 |
| 1 | 9500 | -0.085 |
| 2 | 10000 | -0.125 |
| 3 | 11000 | -0.165 |
| 4 | 0 | 0 |
| 5 | 0 | 0 |
| 6 | 0 | 0 |
| 7 | 0 | 0 |

METHOD OF OPERATING A SYNCHRONOUS MOTOR IN A FLUX WEAKENING MODE AND A CONTROLLER THEREFOR

FIELD OF THE INVENTION

The invention relates to a method of operating a synchronous motor in a flux weakening mode and a controller therefor. The method relates particularly, but not inclusively to a method of operating a permanent magnet synchronous motor (PMSM) having a sensorless closed-loop control system for synchronous operation in a flux weakening mode.

BACKGROUND OF THE INVENTION

The most common types of multi-phase, e.g., three-phase, motors are synchronous motors and induction motors. When three-phase electric conductors are placed in certain geometrical positions, which means at a certain angle from one another, an electrical field is generated. The rotating magnetic field rotates at a certain speed known as the synchronous speed. If a permanent magnet or electromagnet is present in this rotating magnetic field, the magnet is magnetically locked with the rotating magnetic field and consequently rotates at the same speed as the rotating field which results in a synchronous motor, as the speed of the rotor of the motor is the same as the speed of the rotating magnetic field.

A permanent magnet motor uses permanent magnets in the rotor to provide a constant magnetic flux which has a sinusoidal back-electromotive force (back-emf) signal. The rotor locks in when the speed of the rotating magnetic field in the stator is at or near synchronous speed. The stator carries windings which are connected to a controller having a power stage including a voltage supply, typically an alternating current (AC) voltage supply, to produce the rotating magnetic field. Such an arrangement constitutes a PMSM.

PMSMs are similar to brushless direct current (BLDC) motors. BLDC motors can be considered as synchronous DC motors which use a controller having a power stage including a DC voltage supply, suitably converted, to produce the stator rotating magnetic field. BLDC motors therefore use the same or similar control algorithms as AC synchronous motors, especially PMSM motors.

Previously, it has been common in synchronous motor control systems to use at least one sensor, such as a Hall sensor, to detect the rotational position of the rotor during synchronous operation. However, sensorless motor control systems are now preferred.

Such sensorless motor control systems typically include a rotor position and speed estimation module where, during synchronous operation, rotor position and speed can be continuously estimated based on the back-emf induced by the rotating rotor. The estimated rotor positions and speeds are utilized to update and/or compensate the motor control signals during synchronous operation thereby providing sensorless closed-loop synchronous operation motor control.

One of the primary limiting features of synchronous motor drives is the limited excitation control. The internal emf of the motor rises in proportion to the motor speed. Such behavior is desirable in the so-called constant torque range, since it is consistent with the constant volts-per-hertz control, which is normally used during this mode of operation. However, when the speed continues to rise, the voltage limit of the associated frequency converter is reached. The motor is then said to enter the flux-weakening operation. The internal voltage must now be adjusted to be compatible with the applied convener voltage which increases as speed increases. As a result, the motor power factor becomes leading and the current to be commutated by the inverter continues to increase as speed increases. However, the voltage is limited by the rating of the converter and the current is also limited by the rating of the machine. To achieve an extended constant power range for traction application, to eliminate the use of multiple gear ratios, and to reduce the power inverter volt-ampere rating, flux-weakening operation is one of the most applicable solutions.

The publication entitled "A Review of Flux-weakening Control in Permanent Magnet Synchronous Machines" authored by Dongyun Lu and Narayan C. Kar, Department of Electrical & Computer Engineering, University of Windsor, Windsor, ON, Canada, the content of which is herein incorporated by reference, discloses several algorithms for controlling a flux weakening mode of operation of a synchronous motor. This electronic control approach to flux weakening is generally based on the control of the stator current components: d and q-axis currents; to counter the fixed-amplitude magnetic airgap flux venerated by the rotor magnets. One such algorithm is a feed-forward algorithm in which the q axis current command is determined from the torque command or the d-axis current, while the demagnetizing d-axis current is obtained from flux-weakening characteristics as a function of the operating speed. In contrast, in a feed-back algorithm, the motor voltage and/or speed are measured and the demagnetizing current (d-axis component of the current) is adjusted in order to track the voltage limit at increasing speed. The demagnetizing current vector can be adjusted by tracking the voltage error or the speed error. In a hybrid algorithm, the pre-computed d-axis current command for maximum torque per ampere (MTPA) is adjusted by the optimization objectives, while the q-axis current command is determined from the torque command and d-axis current feed-lack. All of these approaches are difficult to implement and require high processing capabilities.

Among other things, what is therefore desired is an improved method of controlling operation of a synchronous motor in a flux weakening mode of operation.

OBJECTS OF THE INVENTION

An object of the invention is to mitigate or obviate to some degree one or more problems associated with known methods of controlling operation of a synchronous motor in a flux weakening mode of operation.

The above object is met by the combination of features of the main claims; the sub-claims disclose further advantageous embodiments of the invention.

Another object of the invention is to provide an improved method of controlling operation of a PMSM having a sensorless closed-loop control system for synchronous operation in a flux weakening mode of operation.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a method of method of controlling operation of a synchronous motor using a closed loop controller, the method comprising: during constant power or constant speed motor operation, determining a value of a stator voltage ($v_s^2$) for an orthogonal rotating reference frame of the motor; comparing the value of the determined stator voltage ($v_s^2$) to a threshold voltage ($v_{s\_max1}^2$) in the orthogonal rotating reference frame, said threshold voltage ($v_{s\_max1}^2$) having a predetermined, selected or calculated value between a value of a maximum stator voltage ($v_{s\_max0}^2$) in the orthogonal rotating reference frame for a basic speed mode of operation of the motor and a value of a maximum stator voltage ($v_{s\_max2}^2$) of the motor closed loop controller; wherein, if the determined value of the stator voltage ($v_s^2$) is greater than or equal to the value of the threshold voltage ($v_{s\_max1}^2$), then controlling operation of the motor in a flux weakening mode of operation until a value of a current component ($i_d - \Delta i_d$) in a d-axis of the orthogonal rotating reference frame reaches a maximum negative value ($-i_{dmax}$), or until the value of the stator voltage ($v_s^2$) is less than the value of the threshold voltage ($v_{s\_max1}^2$).

In a second main aspect, the invention provides a method of controlling operation of a synchronous motor using a closed loop controller, the method comprising: during constant power motor operation, determining a value of a stator voltage ($v_s^2$) for an orthogonal rotating reference frame of the motor; comparing the value of the determined stator voltage ($v_s^2$) to a threshold voltage ($v_{s\_max1}^2$) in the orthogonal rotating reference frame, said threshold voltage ($v_{s\_max1}^2$) having a predetermined, selected or calculated value between a value of a maximum stator voltage ($v_{s\_max0}^2$) in the orthogonal rotating reference frame for a basic speed mode of operation of the motor and a value of a maximum stator voltage ($v_{s\_max2}^2$) of the motor closed loop controller; wherein, if the determined value of the stator voltage ($v_s^2$) is greater than or equal to the value of the threshold voltage ($v_{s\_max1}^2$), then controlling operation of the motor in a flux weakening mode of operation until a value of a current component (Target_$i_d$) in a d-axis of the orthogonal rotating reference frame reaches a maximum negative value ($-i_{dmax}$) of the current component in the d-axis, or, if the determined value of the stator voltage ($v_s^2$) is greater than or equal to the value of the threshold voltage ($v_{s\_max1}^2$) and if a target value of the stator current (Target_$i_s$) less a value of a current component ($i_q^2$) in a q-axis is less than a maximum value ($i_{dmax}$) of the current component in the d-axis, then controlling operation of the motor in a flux weakening mode of operation by controlling by reducing a value of the current component (Target_$i_d$) in the d-axis based on the target value of the stator current (Target_$i_s$) less the value of the current component ($i_q^2$) in the q-axis.

In a third main aspect, the invention provides a method of controlling operation of a synchronous motor using a closed loop controller, the method comprising: during a flux weakening mode of operation of the motor, controlling a value of a stator current component (Target_$i_d$) in a d-axis of an orthogonal rotating reference frame of the motor by selecting a target value of the stator current component (Target_$i_d$) in the d-axis from a look-up table by reference to motor speed (Fw_speed) values, wherein the look-up table values are obtained by measuring motor speed and corresponding values of the stator current component in the d-axis for a plurality of motor voltage supply values.

In a fourth main aspect, the invention provides a closed-loop controller for a motor, said controller comprising a non-transitory computer-readable medium storing machine-readable instructions and a processor, wherein, when the machine-readable instructions are executed by said processor, they configure the controller to start a synchronous motor having a permanent magnet rotor and stator windings in accordance with any of the methods of the first to third main aspects of the invention.

In a fifth main aspect, the invention provides a synchronous motor including a closed loop controller according to the fourth main aspect of the invention.

The summary of the invention does not necessarily disclose all the features essential for defining the invention; the invention may reside in a sub-combination of the disclosed features.

The forgoing has outlined fairly broadly the features of the present invention in order that the detailed description of the invention which follows may be better understood.

Additional features and advantages of the invention will be described hereinafter which form the subject of the claims of the invention. It will be appreciated by those skilled in the art that the conception and specific embodiment disclosed may be readily utilized as a basis for modifying or designing other structures for carrying out the same purposes of the invention.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
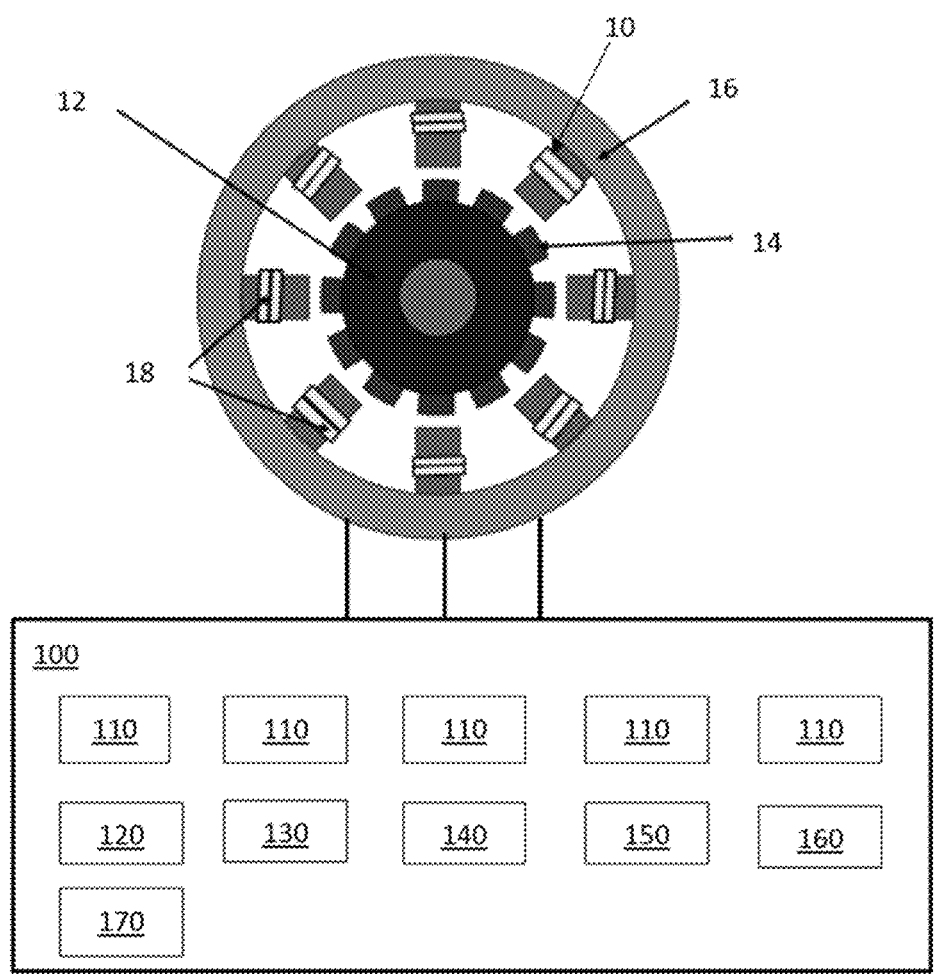
FIG. 1 is a block schematic diagram illustrating a synchronous motor with a closed-loop controller in accordance with the invention.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the Figs. may be implemented in various forms of hardware, software, or combinations thereof. These elements may be implemented in a combination of hardware and software on one or more appropriately programmed general-purpose devices, which may include a processor, a memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode, or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

One advantage of the invention is that it can be implemented on an existing closed-loop controller for synchronous operation without significant modification save for changes in the controller's control algorithm or algorithms. The closed-loop control algorithm in accordance with the invention can be implemented by software, firmware, hardware, or any combination of the foregoing. It may be embodied as an application specific integrated circuit or chip.

FIG. 1 shows an exemplary embodiment of an improved closed-loop controller 100 for a synchronous motor 10 in accordance with concepts of the present invention. The synchronous motor 10 has a permanent magnet rotor 12 with a plurality of permanent magnets 14 and a stator 16 with a plurality of stator windings 18. Whilst the synchronous motor 10 is shown with the stator 16 surrounding the rotor 12 in a conventional manner, it will be understood that the concepts of the present invention are equally applicable to a synchronous motor where the rotor surrounds the stator, i.e., the stator is arranged internally of the rotor.

Figure 2:
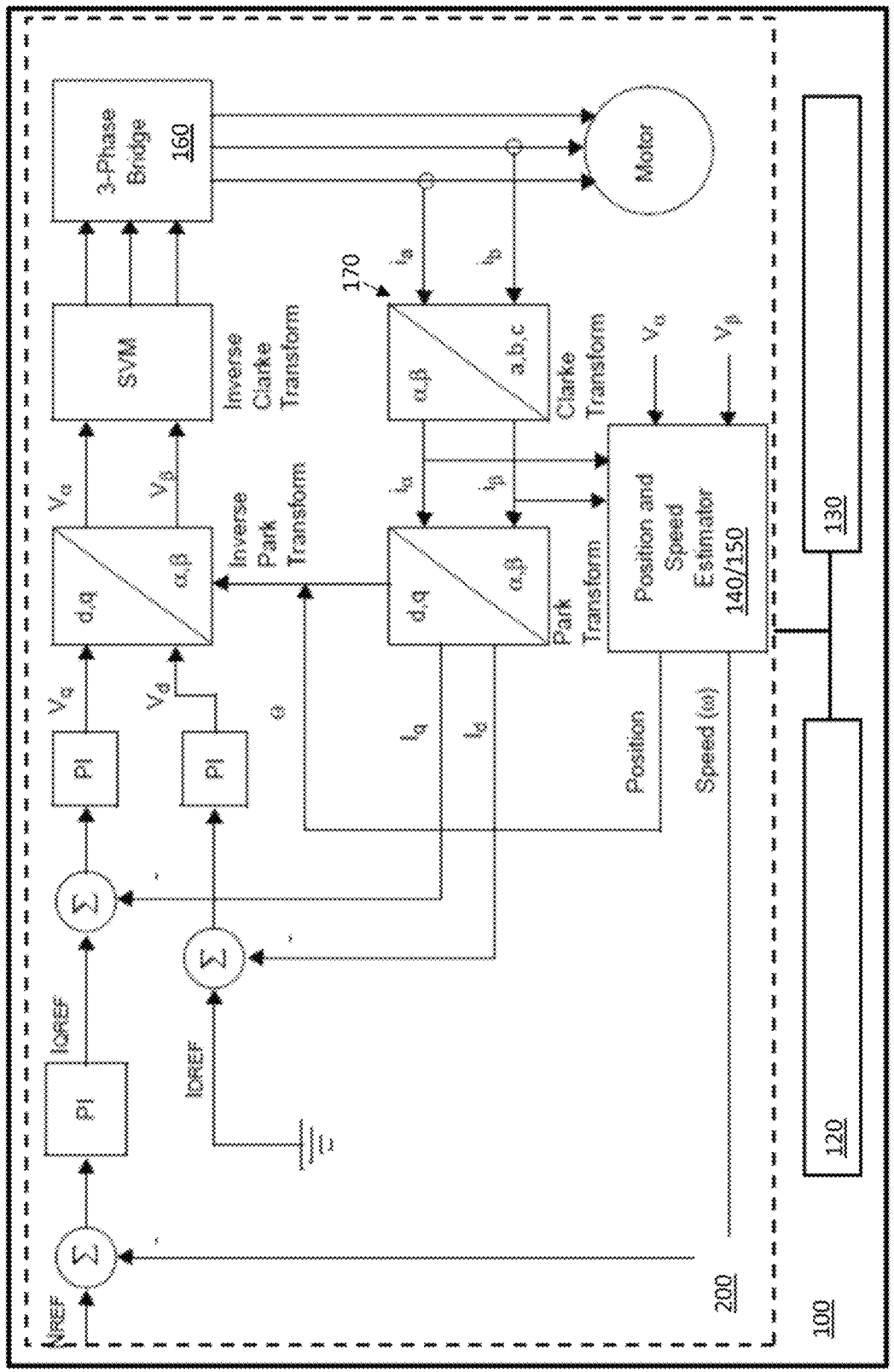
FIG. 2 is a detailed block schematic diagram of a first embodiment of the closed-loop controller in accordance with the invention.

In the illustrated embodiment, the closed-loop controller 100 may comprise a plurality of functional blocks 110 for performing various functions thereof. For example, the closed-loop controller 100 may comprise a suitably modified or suitably configured known vector-based closed-loop controller such as a direct torque control (DTC) closed-loop controller or a Field Oriented Control (FOC) closed-loop controller as described in the publication entitled "Sensorless Field Oriented Control of PMSM Motors" authored by Jorge Zambada, published by Microchip Technology Inc. in 2007 as paper AN1078, the content of which is incorporated herein by way of reference, and as illustrated in FIG. 2 herein but modified as described herein in accordance with the concepts of the invention.

Vector control of a synchronous motor can be summarized as follows:

(i) The 3-phase stator currents are measured. These measurements typically provide values for $i_a$ and $i_b$. $i_c$ is calculated because $i_a$, $i_b$ and $i_c$ have the following relationship:

$$i_a + i_b + i_c = 0.$$

(ii) The 3-phase currents are converted to a two-axis system. This conversion provides the variables $i_\alpha$ and $i_\beta$ from the measured $i_a$ and $i_b$ and the calculated $i_c$ values. $i_\alpha$ and $i_\beta$ are time-varying quadrature current values as viewed from the perspective of the stator, i.e., a two-dimensional stationary orthogonal reference frame or coordinate system.

(iii) The two-axis coordinate system is rotated to align with the rotor flux using a transformation angle calculated at the last iteration of the control loop. This conversion provides the $I_d$ and $I_q$ variables from $i_\alpha$ and $i_\beta$. $I_d$ and $I_q$ are the quadrature currents transformed to the rotating coordinate system, a two-dimensional rotating orthogonal reference frame or coordinate system. For steady state conditions, $I_d$ and $I_q$ are constant.

(iv) Error signals are formed using $I_d$, $I_q$ and reference values for each.

The $I_d$ reference controls rotor magnetizing flux.
The $I_q$ reference controls the torque output of the motor.
The error signals are input to PI controllers.
The output of the proportional integral (PI) controllers provide $V_d$ and $V_q$, which is a voltage vector that will be sent to the motor.

(v) A new transformation angle is estimated where $v_\alpha$, $v_\beta$, $i_\alpha$ and $i_\beta$ are the inputs. The new angle guides the FOC algorithm as to where to place the next voltage vector.

(vi) The $V_d$ and $V_q$ output values from the PI controllers are rotated back to the stationary reference frame using the new angle. This calculation provides the next quadrature voltage values $v_\alpha$ and $v_\beta$.

(vii) The $v_\alpha$ and $v_\beta$ values are transformed back to 3-phase values $v_a$, $v_b$ and $v_c$. The 3-phase voltage values are used to calculate new PWM duty cycle values that generate the desired voltage vector. The entire process of transforming, PI iteration, transforming back and generating PWM is schematically illustrated in at least FIG. 2.

The closed-loop controller 100 may, for example, be implemented using logic circuits and/or executable code/machine readable instructions stored in a memory for execution by a processor 120 to thereby perform functions as described herein. For example, the executable code/machine readable instructions may be stored in one or more memories 130 (e.g., random access memory (RAM), read only memory (ROM), flash memory, magnetic memory, optical memory, or the like) suitable for storing one or more instruction sets (e.g., application software, firmware, operating system, applets, and/or the like), data (e.g., configuration parameters, operating parameters and/or thresholds, collected data, processed data, and/or the like), etc. The one or more memories 130 may comprise processor-readable memories for use with respect to one or more processors 120 operable to execute code segments of the closed-loop controller 100 and/or utilize data provided thereby to perform functions of the closed-loop controller 100 as described herein. Additionally, or alternatively, the closed-loop controller 100 may comprise one or more special purpose processors (e.g., application specific integrated circuit (ASIC), field programmable gate array (FPGA), graphics processing unit (GPU), and/or the like configured to perform functions of the closed-loop controller 100 as described herein.

In a broad aspect, the invention comprises using the closed-loop controller 100 of FIGS. 1 and 2, e.g., using the modified closed loop (FOC) controller 200 of FIG. 2, to implement the method of operating the synchronous motor 10 in a flux weakening mode. The closed-loop controller 100/200 may, as mentioned above, comprise any known, suitable closed-loop controller for synchronous operation and may comprise the FOC controller 200 as described in "Sensorless Field Oriented Control of PMSM Motors" of paper AN1078 or as described in the publication entitled "Sensorless PMSM Field-Oriented Control", the FOC controller 200 being suitably modified or reconfigured to implement the method of operating the motor 10 in accordance with the invention.

In some embodiments, the module 140 may comprise a rotor position and speed estimation module 140 of the modified FOC controller 200 of FIG. 2 and the flux weakening signals in accordance with the invention may comprise inputs to the module 140.

In some embodiments, the module 140 may comprise a rotor flux observer module 150 of a type as described in pages 1-3 of the publication entitled "improved Rotor Flux Observer for Sensorless Control of PMSM With Adaptive Harmonic Elimination and Phase Compensation" authored by Wei Xu et al, CES Transactions on Electrical Machines and Systems, vol. 3, no. 2, June 2019, the content of which is herein incorporated by reference.

Figure 3:
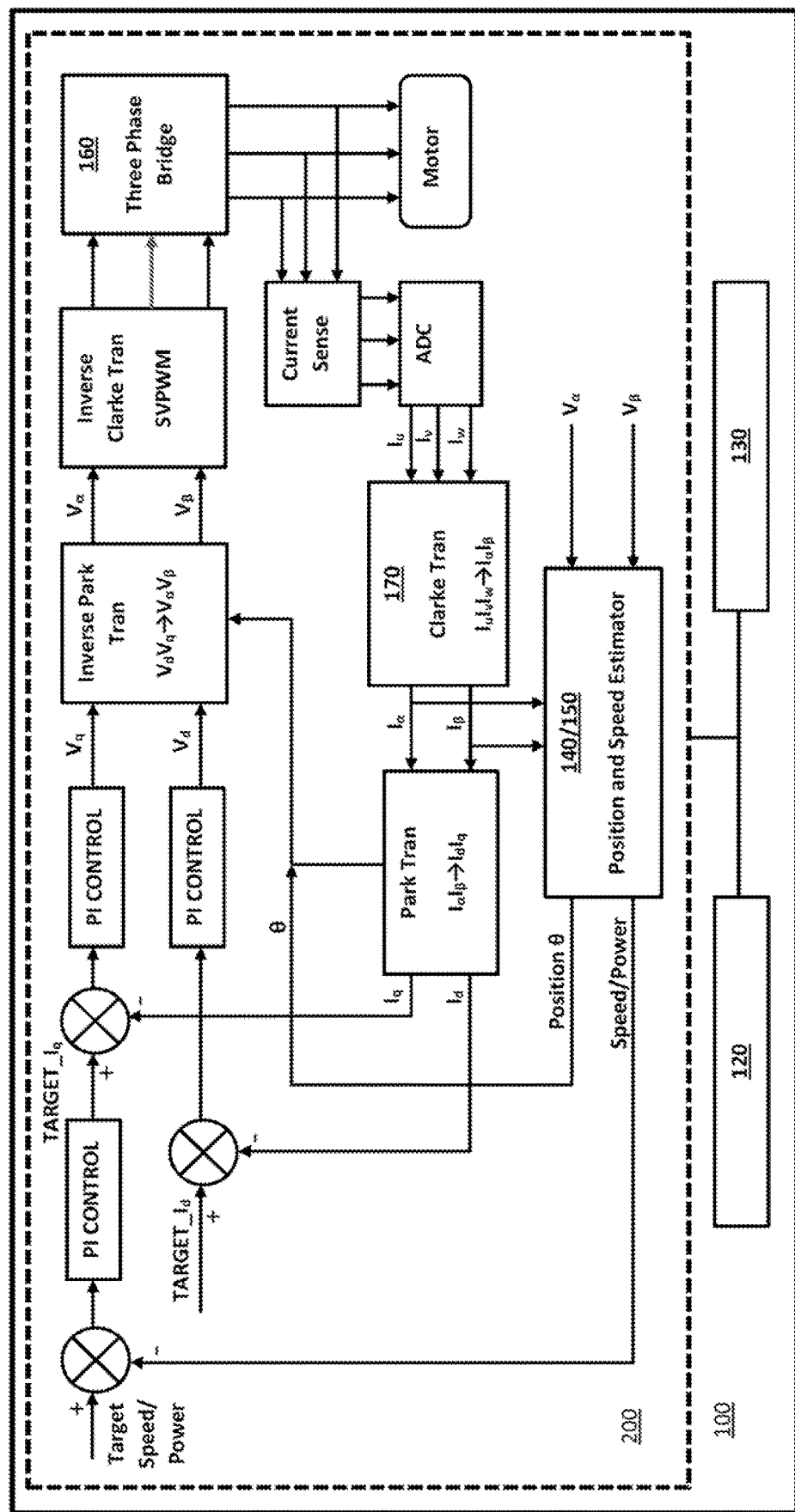
FIG. 3 is a detailed block schematic diagram of a second embodiment of the closed-loop controller in accordance with the invention.

FIG. 3 shows a further embodiment of the modified FOC controller 200 of the invention. Like numerals are used to denote like parts as used in FIG. 2.

The present invention therefore also seeks to supplement the known closed-loop method for operating a synchronous motor, especially a PMSM, by one of a number of novel methods of flux weakening as hereinafter described.

The following describes a mathematical model of synchronous motors such as PMSMs and all variables are in normalized units and established in the d-q rotor reference frame. The stator voltage equations in the rotor reference frame are given as follows:

$$\begin{bmatrix} v_d \\ v_q \end{bmatrix} = \begin{bmatrix} R_s + pL_d & -\omega L_q \\ \omega L_d & R_s + pL_q \end{bmatrix} \begin{bmatrix} i_d \\ i_q \end{bmatrix} + \begin{bmatrix} 0 \\ \omega \lambda \end{bmatrix} \quad (1)$$

where:
$v_d$ and $v_q$: normalized d- and q-axis terminal voltages;
$i_d$ and $i_q$: normalized d- and q-axis armature currents;
$R_s$: normalized stator resistance;
$L_d$ and $L_q$: normalized d- and q-axis stator inductances;
$\omega$: electrical angular velocity in per-unit;
$\lambda$: permanent magnet flux linkage;
p: derivative operator.

For motor drives, the maximum current and voltage must be limited within the system limits. Considering both motor and inverter ratings, they can be expressed as follows:

$$v_q^2 + v_d^2 \leq v_{s\ max}^2 \quad (2) \text{ and}$$

$$i_q^2 + i_d^2 \leq i_{s\ max}^2 \quad (3),$$

where $i_{s\ max}$ and $v_{s\ max}$ are respectively the normalized maximum current of the motor and the normalized maximum stator voltage which is equal to the maximum DC-link voltage of the motor system. The voltage and current limits affect the maximum-speed-with-rated torque capability and the maximum torque-producing capability of the motor drive system, i.e., the FOC controller 200, respectively. For an application such as an electric vehicle drivetrain, for example, it is desirable for the motor drive to possess a wide constant-power operating region by means of flux weakening.

In a basic vector control of the motor 10 using the FOC controller 200, the stator d-axis current ($i_d$) is zero, i.e., "Target_$i_d$=0". The stator q-axis current ($i_q$) defines the motor torque by equation:

$$\text{Torque} = k i_q \quad (4)$$

where k is the flux linkage constant for the motor 10.

Operation of the motor 10 is constrained by voltage ($v_{s\ max}$) and current ($i_{s\ max}$) in accordance with equations (2) and (3) above. In the basic vector control operation of the motor 10, the motor 10 runs in a base speed mode where Target_$i_d$=0 until maximum voltage ($v_{s\ max}$) and/or maximum current ($i_{s\ max}$) is reached.

It is possible to drive the motor 10 in a flux weakening mode where Target_$i_d$<0 to thereby spin the motor 10 at a higher speed than the basic speed mode. The flux weakening methods of the invention allow for constant power control of a motor 10 to have the same input power as for basic speed operation but with significantly higher rotation which provides higher motor drive efficiency. Using the flux weakening methods of the invention provides an extended speed range for operation of the motor 10 under constant power operation.

Flux weakening uses stator current components to counter the fixed-amplitude magnetic airgap flux generated by the rotor permanent magnets 14 thereby allowing the motor 10 to spin faster than the basic speed mode.

The simplified motor equations along the d and q-axes are as follows:

$$e_q = v_q - i_q r - \omega L i_d \quad (5) \text{ and}$$

$$v_d = i_d r - \omega L i_q \quad (6),$$

where $e_q$ is the back-emf of the motor 10;
r is the motor resistance;
L is the motor inductance; and
ω is the motor angular speed.

At the point where $v_q^2 + v_d^2 = v_{s\ max}^2$, the angular speed (w) of the motor 10 and the back-emf ($e_q$) of the motor 10 reach their respective maximum values for the basic speed mode where $i_d$=0.

To implement flux weakening in accordance with the invention, it is necessary to apply the condition $i_d$<0 from equation (5) such that the back-emf ($e_q$) of the motor 10 increases. The implication of this is that the angular speed (ω) of the motor 10 can increase which is indeed the case. This is equivalent to the stator current components ($i_d$) in the d-axis countering the fixed-amplitude magnetic airgap flux generated by the rotor permanent magnets 14 thereby allowing the motor 10 to spin faster than the basic speed mode for the same input power, i.e., under constant power operation.

Figure 4:
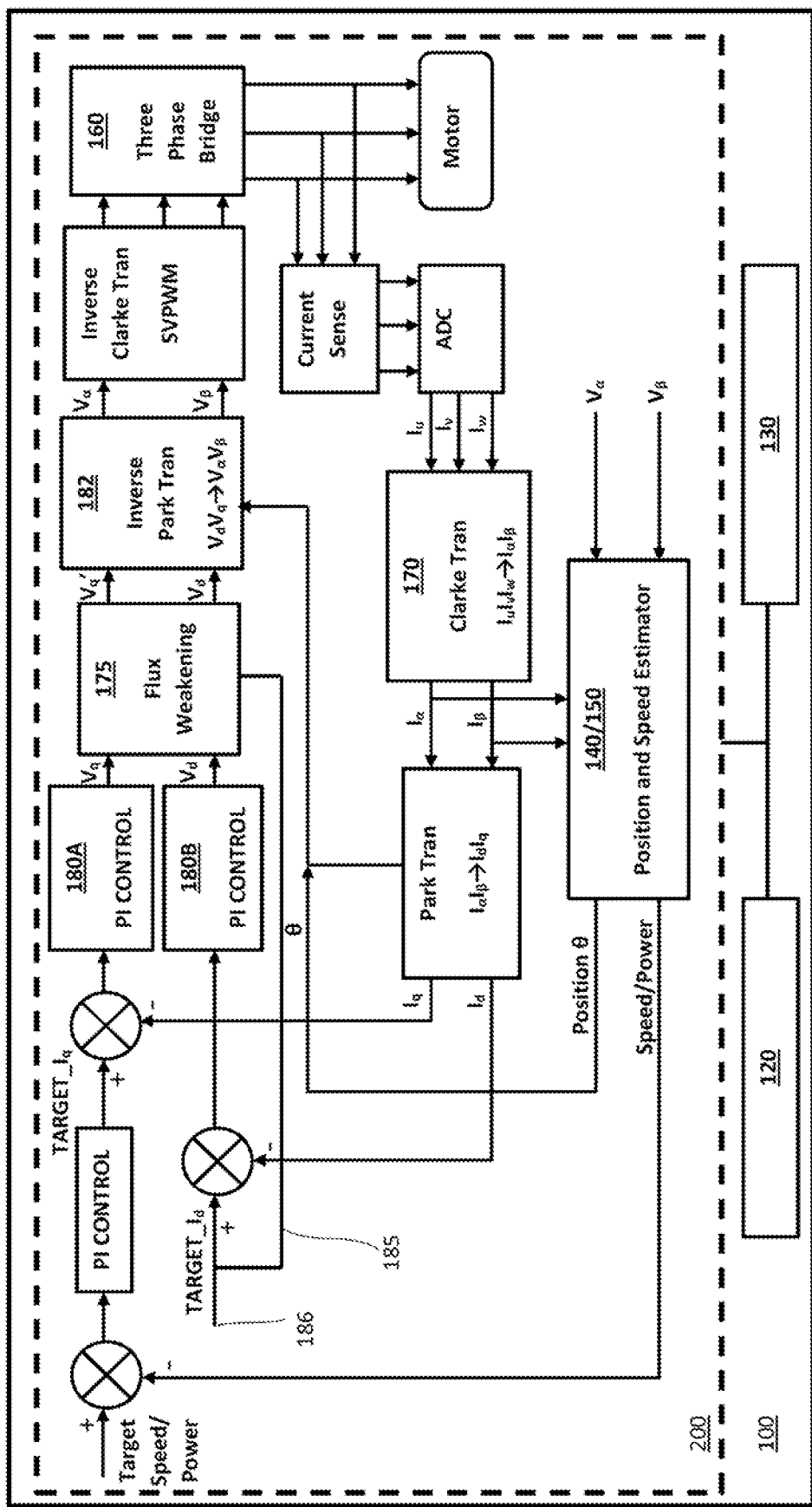
FIG. 4 is a detailed block schematic diagram of a third embodiment of the closed-loop controller in accordance with the invention for implementing the method of the first main aspect of the invention.

Referring now to FIG. 4 which provides a detailed block schematic diagram of a third embodiment of the closed-loop controller 100/200 in accordance with the invention for implementing the method of the first main aspect of the invention. The closed-loop controller 100/200 of FIG. 4 is largely the same as the closed loop controllers 100/200 of FIGS. 2 and 3. Consequently, like numerals are used to denote like parts as used in FIGS. 2 and 3.

The closed loop controller 100/200 of FIG. 4 differs from those of FIGS. 2 and 3 in that it shows a flux weakening module 175 inserted between the d-axis and q-axis proportional integral (PI) controllers 180A,B and an inverse Park transform module 182, and a link 185 from the target $i_d$ input 186 to the flux weakening module 175. However, it should be understood that the method in accordance with the first main aspect of the invention can be implemented by any of the closed loop controllers 100/200 of FIGS. 2-4 as the method requires no physical circuit changes to the closed loop controllers 100/200 but can be implemented by suitable software changes to the algorithms implemented by the closed loop controllers 100/200. FIG. 4 is therefore a visual representation of some of the software changes that can be made to the various embodiments of the closed loop controllers 100/200 for implementing the method of the first main aspect of the invention.

The following description of the implementation of the first main aspect of the invention refers to operation of a vacuum cleaner synchronous motor 10 by way of example only but it will be understood that the method described can be applied to any synchronous motor whose load may be subject to changes and, in particular, whose load may be subjected to changes by external forces such as wind in the case of a fan motor or blocking in the case of a vacuum cleaner motor, etc.

Figure 5:
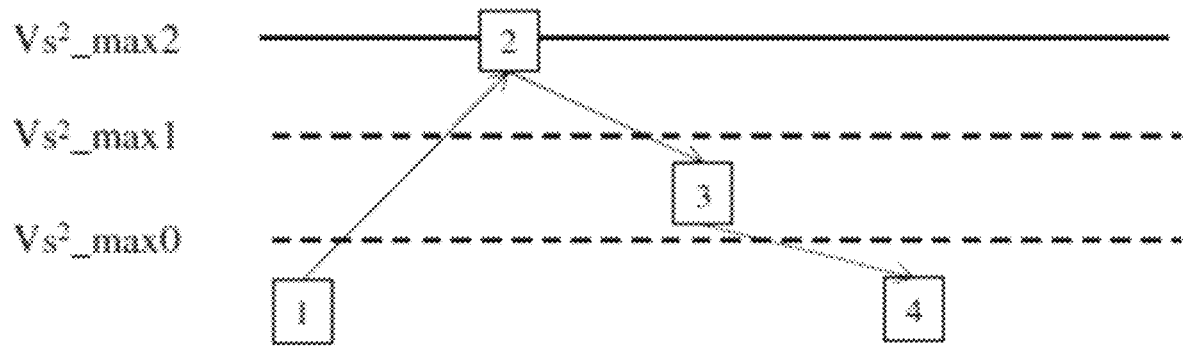
FIG. 5 illustrates operation of a synchronous motor in accordance with the first main aspect of the invention using the closed-loop controller of FIG. 4.

FIG. 5 illustrates operating stages of the vacuum cleaner synchronous motor 10: stage 1 representing normal vacuum cleaner operation; stage 2 representing blocking of the vacuum cleaner suction; stage 3 representing operation of the vacuum cleaner motor 10 in a flux weakening mode; and stage 4 representing return of operation of the vacuum cleaner to normal operation as per stage 1. In FIG. 5, $v_{s\_max2}^2$ comprises a value of a maximum stator voltage ($v_{s\_max2}^2$) of the motor closed loop controller 100/200, $v_{s\_max0}^2$ comprises a value of a maximum stator voltage in the orthogonal rotating reference frame for a basic speed mode of operation of the motor 10, and $v_{s\_max1}^2$ comprises a predetermined, selected, or calculated threshold value.

It is assumed that the vacuum cleaner motor 10 is initially operating normally, i.e., at stage 1 of FIG. 5.

When blocking of the vacuum cleaner occurs as per stage 2 in FIG. 5, the motor load drops, the motor speed (ω) and the motor back-emf ($e_q$) increase. The increase in the motor back-emf ($e_q$) causes the stator current component ($i_q$) in the q-axis to decrease. In the base speed mode of operation of the motor with constant power control, the PI controller 180A for the stator current component ($i_q$) in the q-axis of the closed loop controller 100/200 causes the stator voltage component ($v_q$) in the q-axis to increase and this, in turn, causes the stator voltage ($v_s$) to change according to: $v_s^2 \geq v_{s\_max2}^2$. Under the blocking condition, the stator voltage ($v_s$) of the vacuum cleaner motor rises towards and may exceed the maximum stator voltage ($v_{s\_max2}^2$) of the motor closed loop controller 100/200.

When $v_s^2 = v_{s\_max2}^2$, the motor closed loop controller 100/200 may be configured to lock the value of $v_s^2 = v_{s\_max2}^2$. At this moment with $v_s^2 > v_{s\_max1}^2$, the motor closed loop controller 100/200 is configured to operate the motor 10 in a flux weakening mode of operation. Preferably, the motor closed loop controller 100/200 implements the flux weakening mode of operation of the motor 10 such that it adjusts a value of the stator current component ($i_d$) in the d-axis to decrease. As the value of the stator current component ($i_d$) in the d-axis is zero during normal operation, the motor closed loop controller 100/200 implements the flux weakening mode of operation of the motor 10 preferably by making the stator current component ($i_d$) in the d-axis more or increasingly negative such that:

$$\text{Target\_}i_d = \text{Target\_}i_d - \Delta i_d \quad (7)$$

where $\Delta i_d$ comprises a target reduction in the value of the stator current component ($i_d$) in the d-axis. The flux weakening mode of operation of the motor 10 continues with Target is becoming more negative. As Target_$i_d$ becomes more negative, the stator voltage component ($v_d$) in the d-axis adjusts such as to make the stator current component ($i_d$) in the d-axis more negative. The PI controllers 180A,B of the closed loop controller 100/200 cause the motor 10 back-emf ($e_q$) and the motor speed (ω) to increase. As the motor speed (ω) increases, this causes motor torque and the stator current component ($i_q$) in the q-axis to also increase. Consequently, control of the motor 10 is based on adjustments to one or both of the values of the stator voltage components ($v_d$, $v_q$) in the d-axis and the q-axis.

Under constant power control of the motor 10, any increase in the stator current components ($i_d$, $i_q$) implies that the stator voltage components ($v_d$, $v_q$) will decrease to keep the power constant as Power=$v_q*i_q+v_d*i_d$. This suggests that the stator voltage ($v_s^2$) will drop as the Target_$i_d$ and the stator current component ($i_d$) change to become more negative.

When the stator voltage ($v_s^2$) becomes less than threshold ($v_{s\_max1}^2$), i.e., $v_s^2 < v_{s\_max1}^2$, the Target_$i_d$ and the stator current component ($i_d$) stop changing. Under this condition, the motor 10 is operating in the flux weakening mode.

When the vacuum cleaner blocking condition is partially removed or disappears, the motor load increases and the motor speed ($\omega$) drops. For the same Target_$i_d$, the stator voltage component ($v_d$) in the d-axis also decreases as the motor speed ($\omega$) decreases. Hence, the stator voltage ($v_s^2$) may decrease below the maximum stator voltage ($v_{s\_max0}^2$) in the orthogonal rotating reference frame for the basic speed mode of operation of the motor 10 even though both the stator current component ($i_q$) and the stator voltage component ($v_q$) in the q-axis are increasing. Under this condition, the method of the first main aspect of the invention includes stopping the flux weakening mode of operation and controlling operation of the motor 10 to cause a value of the current component ($i_d+\Delta i_d$) in the d-axis to increase until it reaches the value of the current component ($i_d$) in the d-axis for the basic speed mode of operation of the motor such that the motor 10 returns to the basic speed mode of operation as per stage 4 of FIG. 5. In this instance, the current component ($i_d+\Delta i_d$) in the d-axis is increased according to:

$$\text{Target}\_i_d = \text{Target}\_i_d + \Delta i_d. \quad (8)$$

Figure 6:
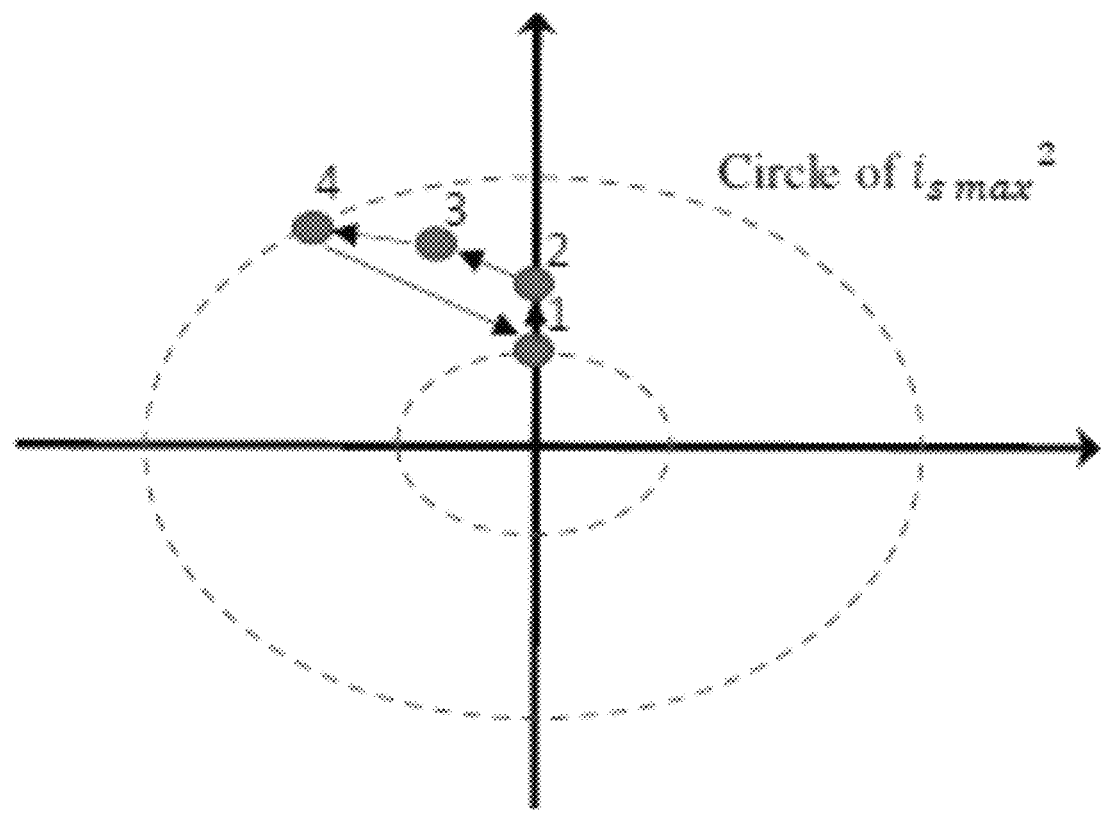
FIG. 6 also illustrates operation of a synchronous motor in accordance with the first main aspect of the invention using the closed-loop controller of FIG. 4.

FIG. 6 also illustrates operation of the synchronous motor 10 in accordance with the first main aspect of the invention using the closed-loop controller 1001200 of FIG. 4.

The following description of this example of the implementation of the first main aspect of the invention also refers to operation of a vacuum cleaner synchronous motor 10 by way of example only. In this instance, the motor 10 is being operated in a constant speed mode.

Referring to both FIGS. 5 and 6, at point "1" in FIG. 6, the motor 10 is being operated in its base speed mode where the stator voltage ($v_s^2$) is less than the threshold ($v_{s\_max1}^2$), i.e., $v_s^2 < v_{s\_max1}^2$ (FIG. 5). When the motor 10 load increases, the stator current component ($i_q$) in the q-axis must increase to maintain constant speed and, in turn, the stator voltage component ($v_q$) in the q-axis also increases which then causes the stator voltage ($v_s^2$) to increase above the threshold ($v_{s\_max1}^2$), i.e., $v_s^2 > v_{s\_max1}^2$. At this point, control of operation of the motor 10 by the closed loop controller 100/200 changes to a flux weakening mode of operation as indicated by point "2" in FIG. 6. Both of the stator current components ($i_d$, $i_q$) in the d-axis and the q-axis so that the speed of the motor 10 increases back to its original basic speed with the stator voltage ($v_s^2$) less again than the threshold ($v_{s\_max1}^2$, i.e., $v_s^2 < v_{s\_max1}^2$ with operation of the motor 10 moving to point "3" in FIG. 6 with the product of the stator current components ($i_d$, $i_q$) in the d-axis and the q-axis remaining less than the maximum stator current ($v_s^2$) according to the relationship:

$$i_d^2 + i_q^2 < i_{s\_max}^2. \quad (9)$$

When the load of the motor 10 increases, the stator current component ($i_q$) in the q-axis further must increase further to maintain the same constant such that the stator voltage ($v_s^2$) increases above the threshold ($v_{s\_max1}^2$), i.e., $v_s^2 > v_{s\_max1}^2$. In this case, both of the stator current components ($i_d$, $i_q$) in the d-axis and the q-axis increases so that speed of the motor is maintained at its constant speed. In the case where the product of the stator current components ($i_d$, $i_q$) in the d-axis and the q-axis become equal to the maximum stator current ($i_s^2$) according to the relationship: $i_d^2+i_q^2=i_{s\_}\max^2$, the stator current component ($i_d$) in the d-axis stops increasing. The stator current component ($i_q$) in the q-axis and stator voltage component ($v_q$) in the q-axis also stop increasing when the product of the stator voltage components ($v_d$, $v_q$) in the d-axis and the q-axis become equal to the maximum stator voltage ($v_{s\_max2}^2$) of the motor closed loop controller 100/200 according to the relationship: $v_d^2+v_q^2=v_{s\_max2}^2$. Operation of the motor 10 moves to point "4" in FIG. 6 which represents the maximum motor speed that can be obtained at the level of motor loading. When the load of the motor 10 decreases to its base speed mode level again, the stator voltage ($v_s^2$) becomes less than the maximum stator voltage ($v_{s\_max0}^2$) in the orthogonal rotating reference frame for the basic speed mode of operation of the motor 10, i.e., $v_s^2 < v_{s\_max0}^2$ and the stator current components ($i_d$, $i_q$) in the d-axis decrease until the stator current component ($i_d$) in the d-axis becomes equal to zero again. At this point, the operation of the motor 10 returns to the basic speed mode of operation at point "1" in FIG. 6 and the flux weakening mode of operation has ended.

The first main aspect of the invention provides a method of controlling operation of the motor 10 using the suitably modified closed loop controller 100/200 of any of FIGS. 2-4 where, during constant power or constant speed motor operation, the method includes determining the value of the stator voltage ($v_s^2$) for the orthogonal rotating reference frame of the motor 10. The value of the determined stator voltage ($v_s^2$) is compared to the threshold voltage ($v_{s\_max1}^2$). The threshold voltage ($v_{s\_max1}^2$) has a value intermediary of the value of the maximum stator voltage ($v_{s\_max0}^2$) for the motor basic speed mode of operation and the value of the maximum stator voltage ($v_{s\_max1}^2$) of the motor closed loop controller 100/200. If it is determined that the value of the stator voltage ($v_s^2$) is greater than or equal to the value of the threshold voltage ($v_{s\_max1}^2$), then the closed loop controller 100/200 is configured to control operation of the motor in a flux weakening mode of operation until a value of the current component ($i_d-\Delta i_d$) in a d-axis reaches a maximum negative value ($-i_{dmax}$), or until the value of the stator voltage ($v_s^2$) is less than the value of the threshold voltage ($v_{s\_max1}^2$).

The step of operating the motor 10 in a flux weakening mode of operation may include causing a value of the current component ($i_d-\Delta i_d$) in the d-axis to reduce below a value of the current component ($i_d$) in the d-axis for the basic speed mode of operation of the motor 10 until the value of the current component ($i_d-\Delta i_d$) in the d-axis reaches the maximum negative value ($-i_{dmax}$), or until the value of the stator voltage ($v_s^2$) is less than the value of the threshold voltage ($v_{s\_max1}^2$).

Optionally, the method of the first main aspect of the invention may include the step of, if the determined value of the stator voltage ($v_s^2$) is less than the value of the maximum stator voltage ($v_{s\_max0}^2$) for the basic speed mode of operation of the motor 10, then stopping the flux weakening mode of operation and controlling operation of the motor 10 to cause a value of the current component ($i_d+\Delta i_d$) in the d-axis to increase until it reaches the value of the current component ($i_d$) in the d-axis for the basic speed mode of operation of the motor 10.

Optionally, the method of the first main aspect of the invention may include the step of, if the determined value of the stator voltage ($v_s^2$) is greater than or equal to the value of the maximum stator voltage ($v_{s\_max2}^2$) of the motor closed loop controller 100/200, then controlling operation of the motor 10 to cause a value ($v_q'$) of a voltage component in the q-axis of the orthogonal rotating reference frame to have a value derived from a difference between the value of the maximum stator voltage ($v_{s\_max2}^2$) of the motor closed loop controller 100/200 and a value ($v_d^2$) of a voltage component in the d-axis of the orthogonal rotating reference frame. The value of the voltage component ($v_q'$) in the q-axis may be determined from:

$$v_q' = \sqrt{Vs^2\_max2 - v_d^2}. \quad (10)$$

Optionally, the method of the first main aspect of the invention may include the step of, if the determined value of the stator voltage ($v_s^2$) is greater than or equal to the value of the maximum stator voltage ($v_{s\_max2}^2$) of the motor closed loop controller 100/200, then controlling operation of the motor 10 to cause a value ($v_q'$) of a voltage component in the q-axis of the orthogonal rotating reference frame to have a value equal to a value of the voltage component ($v_q$) in the q-axis for the basic speed mode of operation of the motor 10.

Figure 7:
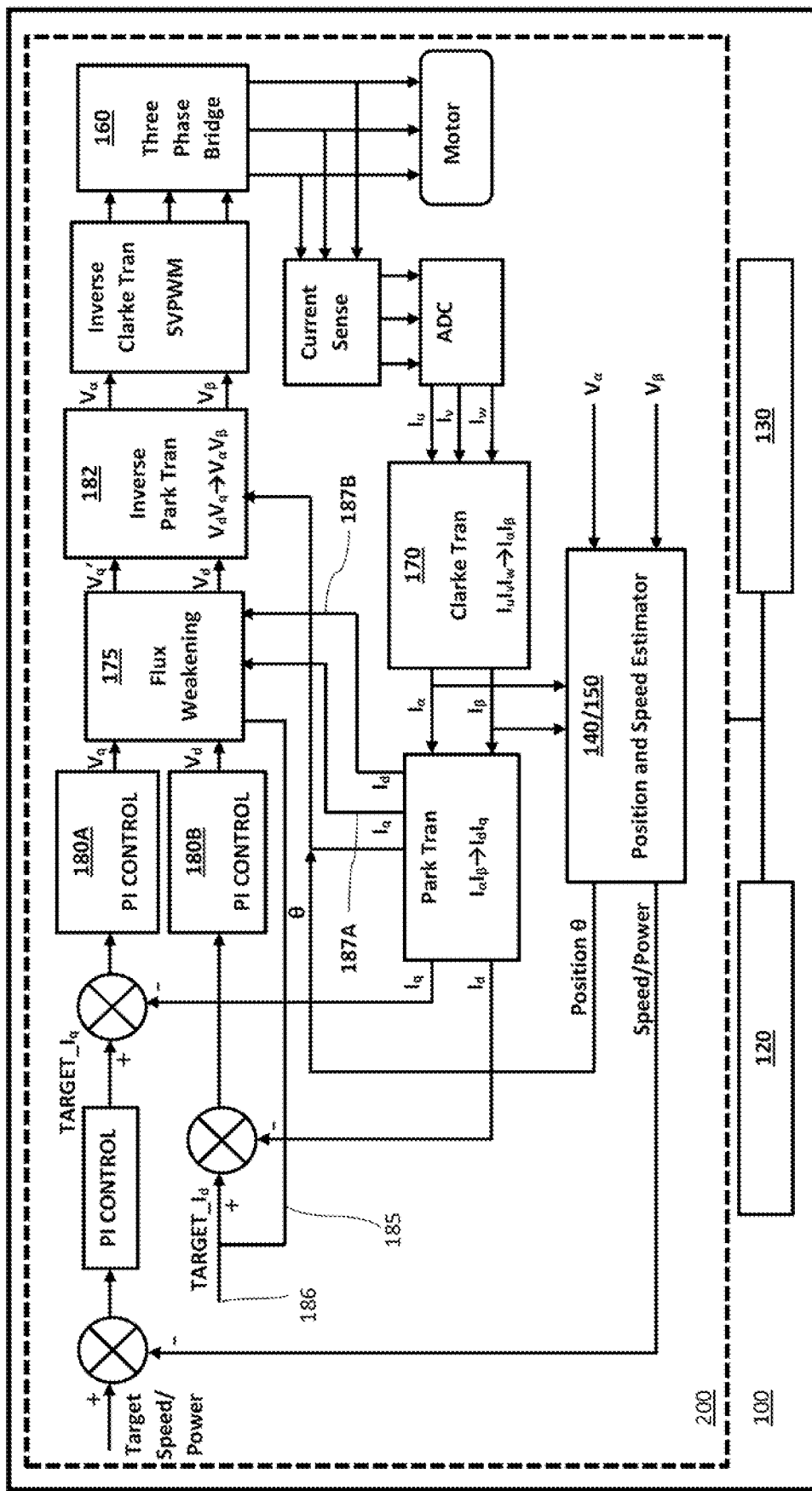
FIG. 7 is a detailed block schematic diagram of a fourth embodiment of the closed-loop controller in accordance with the invention for implementing the method of the second main aspect of the invention.

Referring now to FIG. 7 which provides a detailed block schematic diagram of a fourth embodiment of the closed-loop controller 100/200 in accordance with the invention for implementing the method of the second main aspect of the invention. The closed-loop controller 100/200 of FIG. 7 is largely the same as the closed loop controllers 100/200 of FIGS. 2-4. Consequently, like numerals are used to denote like parts as used in FIGS. 2-4.

The closed loop controller 100/200 of FIG. 7 differs from those of FIGS. 2-4 in that, in addition to showing a flux weakening module 175 inserted between the d-axis and q-axis PI controllers 180A,B and an inverse Park transform module 182, it includes d-axis and q-axis current inputs 187A,B from a Park transform module 188 to the flux weakening module 175. However, it should be understood that the method in accordance with the second main aspect of the invention can be implemented by any of the closed loop controllers 100/200 of FIGS. 2-4 and 7 as the method requires no physical change to the closed loop controllers 100/200 but can be implemented by suitable software changes to the algorithms of the closed loop controllers 100/200. FIG. 7 is therefore a visual representation of some of the software changes that can be made to the various embodiments of the closed loop controllers 100/200 for implementing the method of the second main aspect of the invention.

The following description of the implementation of the second main aspect of the invention also refers to operation of a vacuum cleaner synchronous motor 10 by way of example only but it will again be understood that the method described can be applied to any synchronous motor whose load may be subject to changes during operation of the motor 10.

The power of the motor 10 is defined by either of the following equations:

$$\text{power} = v_q * i_q + v_d * i_d \text{ or} \quad (11)$$

$$\text{power} = e_q * i_q + i_s^2 r; \quad (12)$$

where r is the resistance of the stator 16.

Drive efficiency of the motor 10 is defined by following equation:

$$\text{Efficiency} = \frac{e_q i_q}{e_q i_q + i_s^2 r} \quad (13)$$

For a field or flux weakening mode of operation of the motor 10 by stator current, the quantity $i_s^2 r$ is defined as a target stator current value (Target_$i_s^2$) where:

$$\text{Target}\_i_s^2 = i_s^2 = i_q^2 + i_d^2 \leq i_{s\,max}^2, \quad (14)$$

where $i_{s\,max}^2$ is a maximum value of the stator current.

Under constant power control operation of the motor 10, the motor power defined by power=$e_q * i_q + i_s^2 r$ remains constant too. Therefore, the drive efficiency of the motor 10 also remains constant during a flux weakening mode of operation of the motor 10. It is therefore preferred that the target stator current value (Target_$i_s^2$) is set or controlled to be as low as possible to maximize motor drive efficiency.

Figures 9, 11:
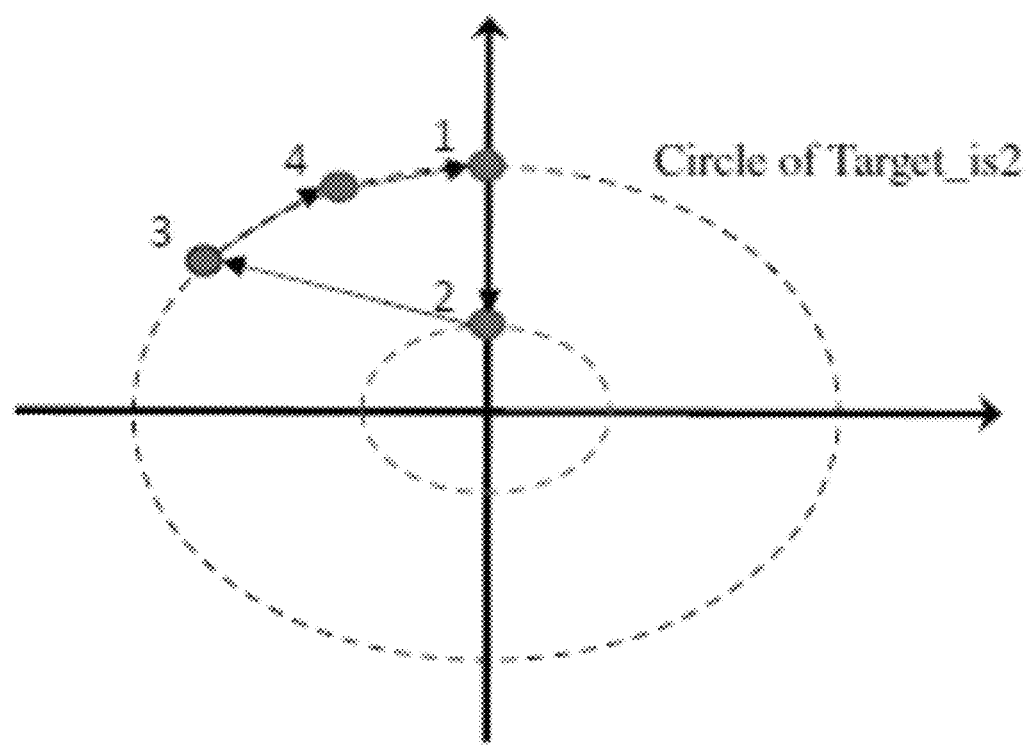
FIG. 9 also illustrates operation of a synchronous motor in accordance with the second main aspect of the invention using the closed-loop controller of FIG. 7.
FIG. 11 is a look-up table for use in the third main aspect of the invention.

During a flux weakening mode of operation of the motor 10, the operating point defined by the stator current components ($i_d$, $i_q$) is confined within a circle defined by the target stator current value (Target_$i_s^2$) as shown in FIG. 9. The pair of values ($e_q$, $i_q$) comprising the back-emf ($e_q$) of the motor 10 and the stator current component ($i_q$) in the q-axis is controlled under a constant power condition by the closed loop controller 100/200 d-axis and q-axis PI controllers 180A,B. This results in the stator current component ($i_q$) in the q-axis automatically defining both the back-emf value ($e_q$) of the motor 10 and the stator current component ($i_s$) in the d-axis during flux weakening mode of operation of the motor 10.

Figure 8:
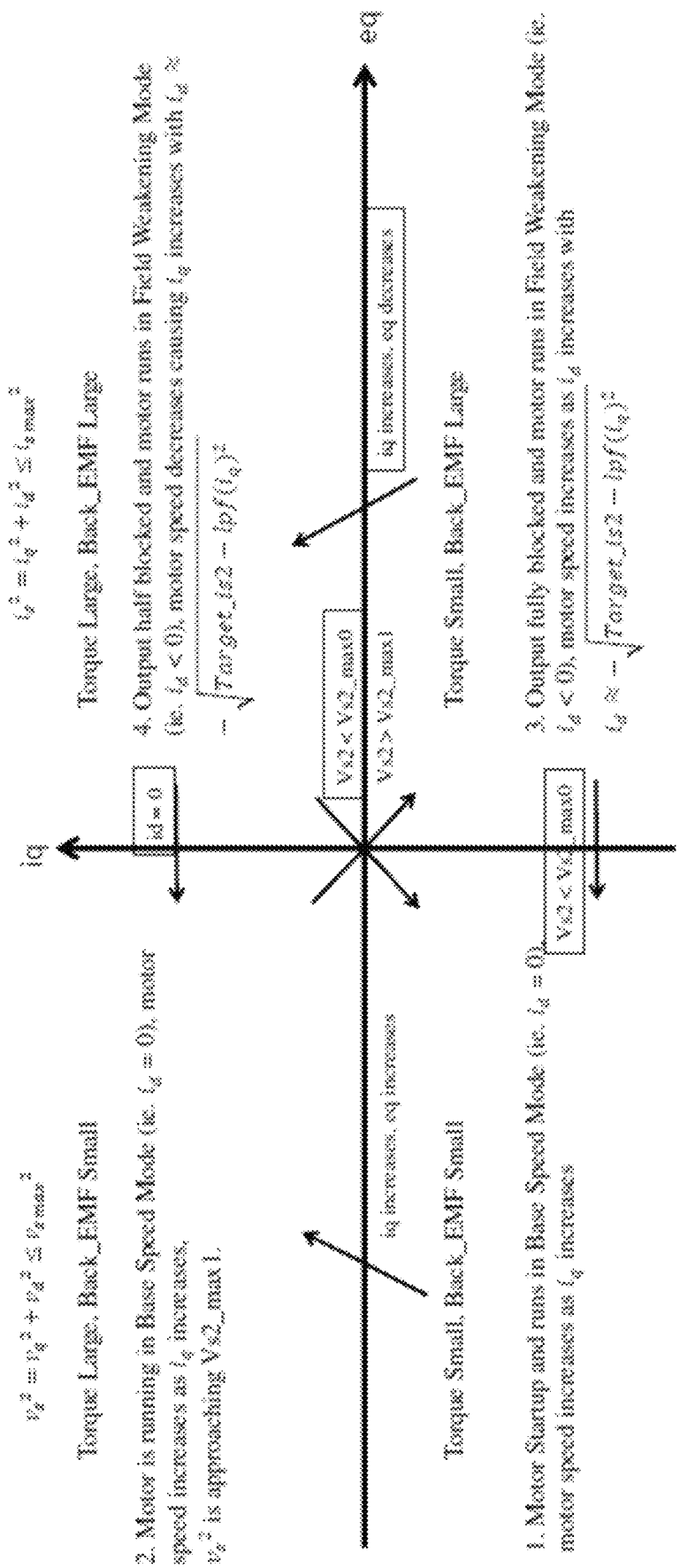
FIG. 8 illustrates operation of a synchronous motor in accordance with the second main aspect of the invention using the closed-loop controller of FIG. 7.

FIG. 8 illustrates the four stages of operating the motor 10 using the stator current as the control parameter including the flux weakening mode of operation of the motor 10.

In stage 1, the motor 10 on start-up is controlled to run in the basic speed mode where the stator current component ($i_d$) in the d-axis is equal to zero. In this case, the speed of the motor 10 increases as the value of stator current component ($i_q$) in the q-axis increases. In the basic speed mode of operation of the motor 10, the motor torque is small and the motor back-emf ($e_q$) is small. Also, as the value of stator current component ($i_q$) in the q-axis increases, the value of the motor back-emf ($e_q$) increases.

In stage 2 of FIG. 8, the motor 10 is still in the basic speed mode of operation with the stator current component ($i_d$) in the d-axis is equal to zero, but with the speed of the motor 10 continuing to increase as the value of stator current component ($i_q$) in the q-axis increases such that the value of the stator voltage ($v_s^2$) approaches the threshold ($v_{s\_max1}^2$). In this stage, the motor 10 has a large torque and a small back-emf ($e_q$).

In stage 3, the load of the motor 10 changes due to, for example, blocking of the vacuum cleaner. The closed loop controller 100/200 implements the flux weakening mode of operation of the motor where the stator current component ($i_d$) in the d-axis is controlled to be less than zero such that the motor speed increases as the value of stator current component ($i_d$) in the d-axis increases where the stator current component ($i_d$) in the d-axis is controlled in accordance with the relationship:

$$i_d = -\sqrt{\text{Target}\_is^2 - ipf(i_q)_2}. \quad (15)$$

In stage 4 where the vacuum cleaner in this example is now partially blocked, the motor 10 continues in the flux weakening mode of operation with the stator current component ($i_d$) in the d-axis is controlled to be less than zero. The speed of the motor 10 decreases causing the value of the stator current component ($i_q$) in the q-axis to increase where the stator current component ($i_d$) in the d-axis continues to be controlled in accordance with the above relationship (15). When the value of the stator current component ($i_d$) in the d-axis becomes zero, the flux weakening mode of operation is ended and the closed loop controller 100/200 returns control of the motor 10 to the basic speed mode of operation (stage 1).

Referring again to FIG. 9 which provides an illustration by way of example only of operation of the synchronous motor 10 in accordance with the second main aspect of the invention using the closed-loop controller 100/200 of FIG. 7. At point "1" in FIG. 9, the vacuum cleaner is not blocked and the motor 10 is controlled by the closed loop controller 100/20 to run in the basic speed mode where the value of the stator voltage ($v_s^2$) is less than the threshold ($v_{s\_max1}^2$). When the vacuum cleaner becomes blocked, the value of the stator current component ($i_q$) in the q-axis decreases and the closed loop controller 100/200 implements the flux weakening mode of operation as indicated at point "2" in FIG. 9. The stator current components ($i_d$, $i_q$) both decrease until $i_d^2 + i_q^2 = \text{Target\_}i_s^2$ and operation of the motor 10 move to point "3" in FIG. 9. When the vacuum cleaner becomes less blocked such as half-blocked, the motor 10 will operate such that $i_d^2 + i_q^2$ Target_$i_s^2$. Hence, the stator current component ($i_d$) in the d-axis decreases, the stator current component ($i_q$) in the q-axis decreases until stator current component ($i_d$) in the d-axis again equals zero and the motor 10 operation moves to point "4" in FIG. 9 and returns to the basic speed mode of operation.

The method in accordance with the second aspect of the invention therefore provides a method of controlling operation the motor 10 using a suitable modified closed loop controller 100/200. During constant power motor operation, the closed loop controller 100/200 determines a value of the stator voltage ($v_s^2$) for the orthogonal rotating reference frame of the motor 10. The determined stator voltage ($v_s^2$) is compared to the threshold voltage ($v_{s\_max1}^2$). If the determined value of the stator voltage ($v_s^2$) is greater than or equal to the value of the threshold voltage ($v_{s\_max1}^2$), then the motor 10 is controlled to operate in a flux weakening mode until a value of a current component (Target_$i_d$) in the d-axis reaches a maximum negative value ($-i_{dmax}$). Or, if the determined value of the stator voltage ($v_s^2$) is greater than or equal to the value of the threshold voltage ($v_{s\_max1}^2$) and if a target value of the stator current (Target_$i_s$) less a value of a current component ($i_q^2$) in a q-axis is less than a maximum value ($i_{dmax}$) of the current component in the d-axis, then the motor 10 is controlled to operate in a flux weakening mode of operation by reducing a value of the current component (Target_$i_d$) in the d-axis based on the target value of the stator current (Target_$i_s$) less the value of the current component ($i_q$) in the q-axis. In the flux weakening mode, the value of the current component (Target_$i_d$) in the d-axis may be reduced according to the equation:

$$\text{Target\_}i_d = -\sqrt{\text{Target\_}is^2 - ipf(i_q)^2}. \quad (16)$$

Figure 10:
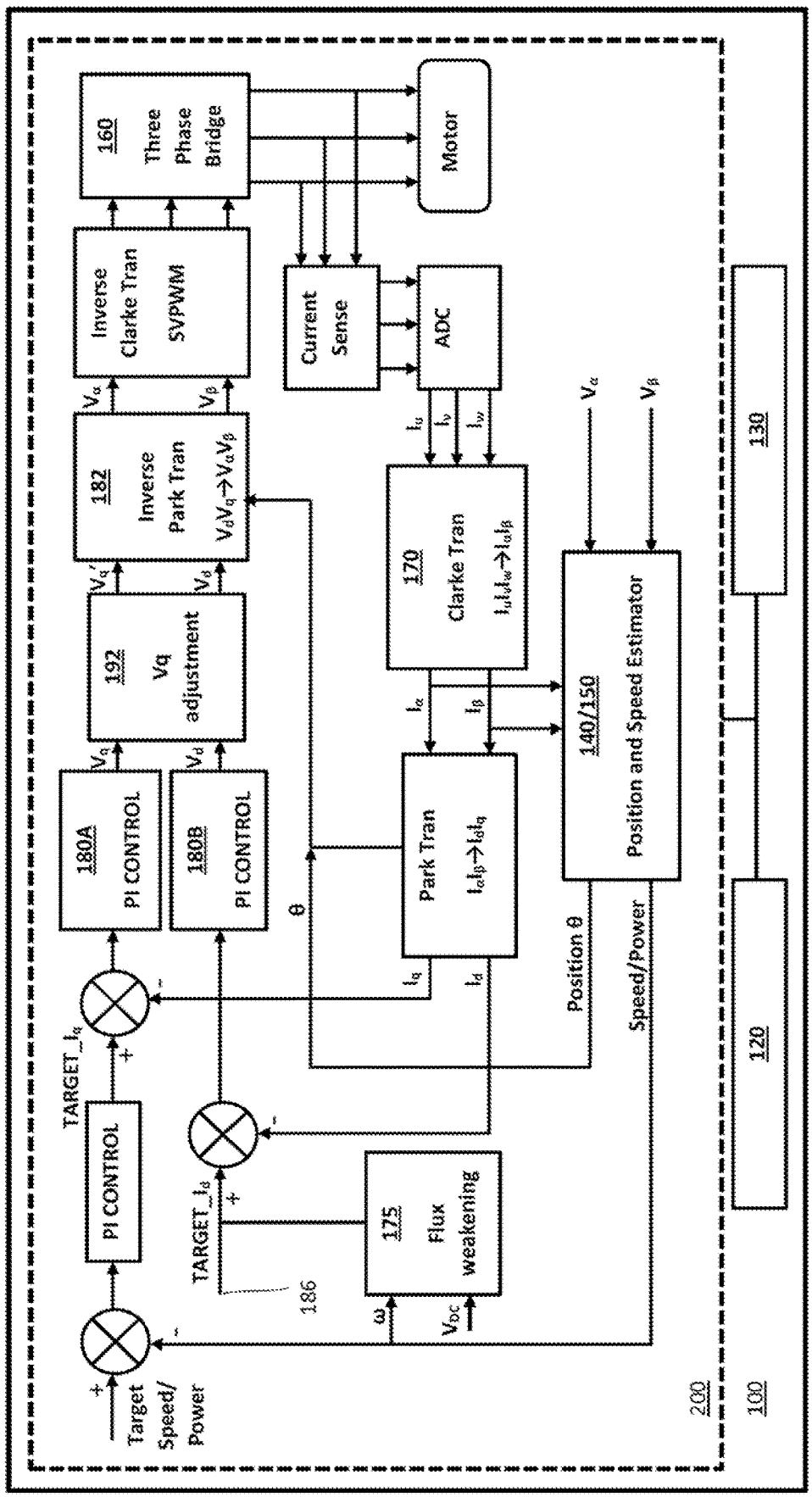
FIG. 10 is a detailed block schematic diagram of a fifth embodiment of the closed-loop controller in accordance with the invention for implementing the method of the third main aspect of the invention.

Referring now to FIG. 10 which provides a detailed block schematic diagram of a fifth embodiment of the closed-loop controller 100/200 in accordance with the invention for implementing the method of the third main aspect of the invention. The closed-loop controller 100/200 of FIG. 10 is largely the same as the closed loop controllers 100/200 of FIGS. 2-4 and 7. Consequently, like numerals are used to denote like parts as used in FIGS. 2-4 and 7.

The closed loop controller 100/200 of FIG. 10 differs from those of FIGS. 2-4 and 7 in that the flux weakening module 175 is connected to the Target_$i_d$ input 186 of the closed loop controller 100/200 and receives as inputs the estimated speed (w) from the position and speed estimator module 140/150 as well as the controller DC line voltage. Another difference is that the flux weakening module 175 as seen in FIGS. 4 and 7 is replaced by a stator voltage component ($v_q$) in the q-axis adjustment module 192, being placed between the d-axis and q-axis PI controllers 180A,B and the inverse Park transform module 182. However, it should be understood that the method in accordance with the third main aspect of the invention can be implemented by any of the closed loop controllers 100/200 of FIGS. 2-4 and 7 as the method requires no physical change to the closed loop controllers 100/200 but can be implemented by suitable software changes to the algorithms of the closed loop controllers 100/200. FIG. 10 is therefore a visual representation of some of the changes that can be made to the various embodiments of the closed loop controllers 100/200 for implementing the method of the third main aspect of the invention.

For the motor 10 where it is known when and how the flux weakening mode of operation is to be implemented, it is possible to tabulate the motor speed (denoted herein as "FW_speed") versus the target stator current component (Target_$i_d$) in the d-axis and construct a flux weakening (FW) look-up table stored in the memory 130 of the closed loop controller 100/200. An example of a FW look-up table 194 is shown in FIG. 11.

For flux weakening mode of operation of the motor 10 under the control of motor speed, the "F/W_speed; Target_$i_d$" pairs in the look-up table 194 are obtained by measurement of the motor operation under specified conditions, i.e., measurements will be taken of the speed of the motor 10 for certain motor DC supply voltage over closed loop controller bus voltage (denoted herein as "$V_{nominal}$"). Whenever the motor DC supply voltage over the closed loop controller bus voltage ($V_{BUS}$) deviates $V_{nominal}$ an adjustment/compensation on the FW_speed index (left-most column in FIG. 11) of the look-up table 194 is required.

FW_speed is calculated as follows prior to table look-up and possible linear approximation:

$$\text{Fw\_speed} = \frac{V_{nominal} \times \text{Motor speed}}{V_{BUS}} \quad (17)$$

The following description of the implementation of the second main aspect of the invention also refers to operation of a vacuum cleaner synchronous motor 10 by way of example only but it will again be understood that the method described can be applied to any synchronous motor whose load may be subject to changes during operation of the motor 10.

Referring to the look-up table 194 of FIG. 11, for Fw_speed between Fw_speed(0) and Fw_speed(end), the Target_$i_d$ value will be selected from the table 194 but may be calculated by a linear approximation based on the respective FW_speed; Target_$i_d$ pair listed in the FW table 194. For example, if the Fw_speed is between Fw_speed(n) and Fw_speed(n−1) of the FW table 194, the Target_$i_d$ can be calculated as follows:

$$\text{Target\_id} = \left(\frac{\text{Target\_id}(n) - \text{Target\_id}(n-1)}{\text{Fw\_speed}(n) - \text{Fw\_speed}(n-1)}\right)(\text{Fw\_speed} -$$

$$\text{Fw\_speed}(n-1)) + \text{Target } id(n-1)$$

For Fw_speed smaller than the Fw_speed(0) (i.e., index 0 in the FW table 194) then the value of the target is will be set to zero (Target_$i_d$=0).

For Fw_speed larger than the Fw_speed(end), (i.e., index 3 in the FW table 194), the value of the target is will be set to −0.165 (Target_$i_d$=−0.165) in this embodiment.

It will be understood that the actual values of Target_$i_d$ for different scenarios will be dependent on the measured FW_speed; Target_$i_d$ pairs in the FW table 194.

The method in accordance with the third aspect of the invention therefore provides a method of controlling operation the motor 10 using a suitably modified closed loop controller 100/200. During a flux weakening mode of operation of the motor 10, the closed loop controller 100/200 controls a value of a stator current component (Target_$i_d$) in a d-axis by selecting a target value of the stator current component (Target_$i_d$) in the d-axis from the look-up table 194 by reference to motor speed (Fw_speed) values and/or by linear approximation of a selected pair of motor speed (Fw_speed) value and stator current component (Target_$i_d$) value.

The stator voltage component ($v_q$) in the q-axis adjustment module 192 is optional. The q-axis adjustment module 192 is configured to implement to implement equation (2). The method includes determining the value of a stator voltage ($v_s^2$) and, if the determined value of the stator voltage ($v_s^2$) is greater than or equal to the value of the maximum stator voltage ($v_{s\_max2}^2$) of the closed loop controller 100/200, then controlling operation of the motor 10 to cause a value ($v_q'$) of a voltage component in the q-axis to have a value derived from a difference between the value of the maximum stator voltage ($v_{s\_max2}^2$) of the motor closed loop controller 100/200 and the value ($v_d^2$) of a voltage component in the d-axis. The value of the voltage component ($v_q'$) in the q-axis may be determined from equation (10).

The method may include, if the determined value of the stator voltage ($v_s^2$) is greater than or equal to the value of the maximum stator voltage ($v_{s\_max2}^2$) of the motor closed loop controller 100/200, then controlling operation of the motor 10 to cause the value ($v_q'$) of the voltage component in the q-axis of the orthogonal rotating reference frame to have a value equal to a value of the voltage component ($v_q$) in the q-axis for the basic speed mode of operation of the motor.

The closed-loop motor operating method according to the various aspects of the invention can be utilized in synchronous motors 10 with various stator winding configurations as illustrated by FIGS. 12-17.

Figure 12:
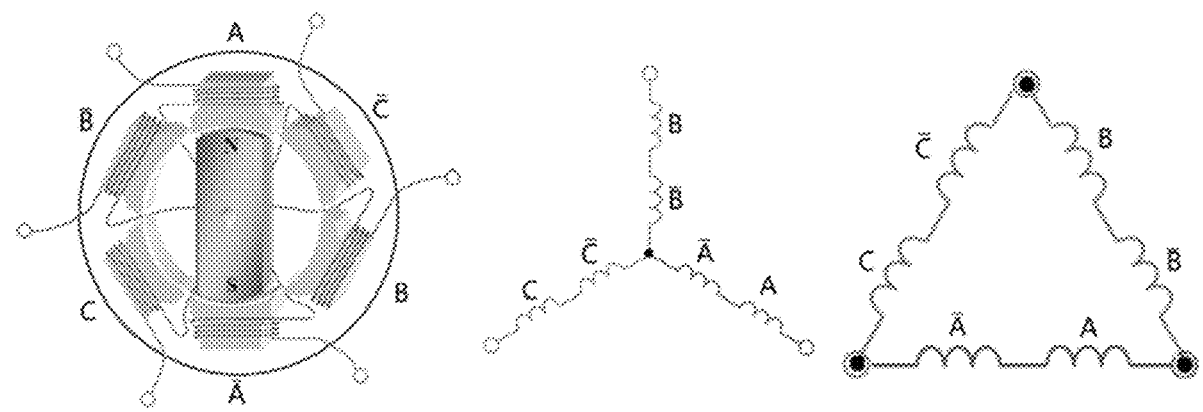
FIG. 12 is a schematic diagram showing the delta and star (or Y) stator windings configurations of a synchronous motor in which the closed-loop start-up method in accordance with the invention can be implemented.
Figure 13:
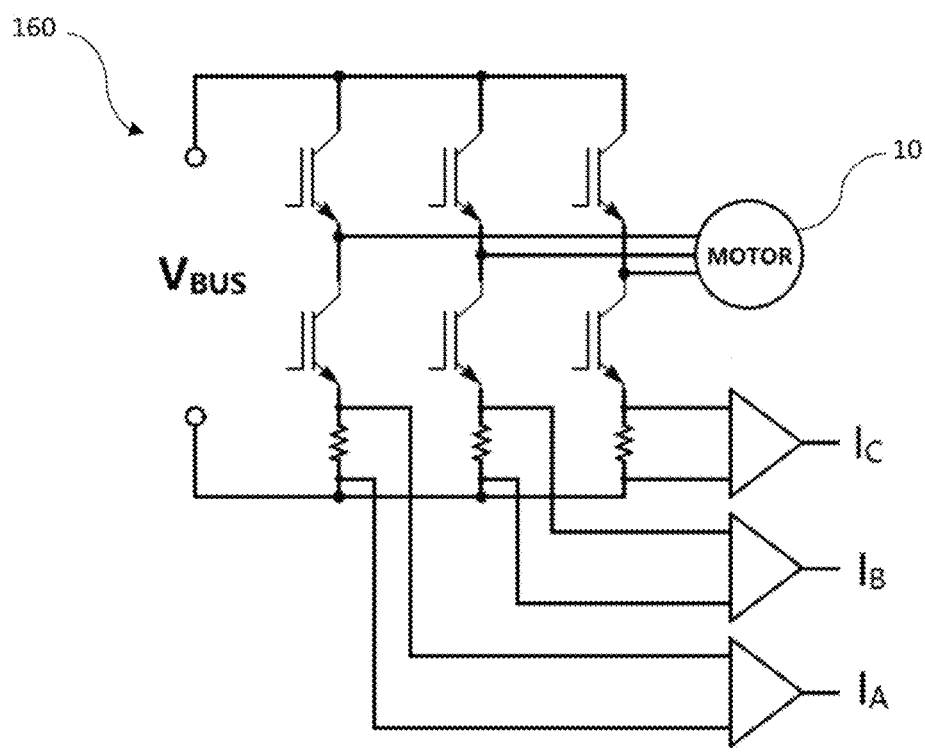
FIG. 13 is a schematic block diagram of a power stage for the closed-loop motor control system in accordance with the invention for the synchronous motor of FIG. 12.

FIG. 12 is a schematic diagram showing the conventional delta and star (or Y) stator windings configurations of the synchronous motor 10 whilst FIG. 13 provides a schematic block diagram of a 3-phase power stage/bridge 160 for the closed-loop controller 100/200 for the synchronous motor 10 of FIG. 1. Two or more of the outputs of the 3-phase bridge module 160 of the closed-loop controller 100/200 of FIG. 12 comprising two or more of the sensed currents denoted as "$I_A$", "$I_B$" and "$I_C$" in FIG. 13 are fed to the Clarke Transform module 170 of the closed-loop controller 100/200 for processing. Typically, the sensed currents "$I_A$", "$I_B$" are selected for the Clarke Transform module 170.

Figure 14:
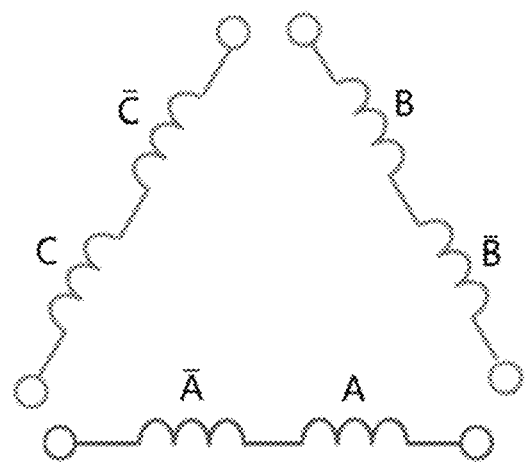
FIG. 14 is a schematic diagram showing a six-wire configuration of stator windings of a synchronous motor in which the closed-loop start-up method in accordance with the invention can be implemented.
Figure 15:
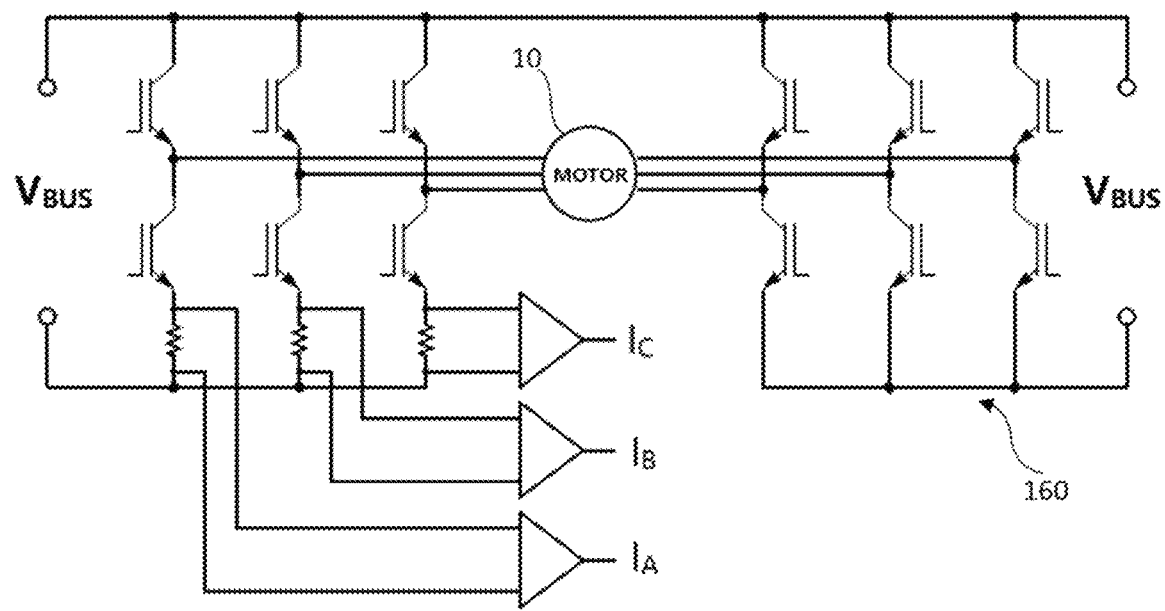
FIG. 15 is a schematic block diagram of a power stage for the closed-loop motor control system in accordance with the invention for the synchronous motor of FIG. 14.

In contrast to FIG. 12, FIG. 14 provides a schematic diagram showing a six-wire configuration of the stator windings 18 of the synchronous motor 10 whilst FIG. 15 provides a schematic block diagram of a 3-phase power stage/bridge 160 for the closed-loop controller 100/200 for the synchronous motor 10 with this stator winding configuration. The six-wire stator winding configuration results from none of the three stator windings 18 having any common connection points in contrast to the conventional delta or star stator winding configurations of FIG. 12 which have at least one common connection point between at least two of the stator windings 18.

Figure 17:
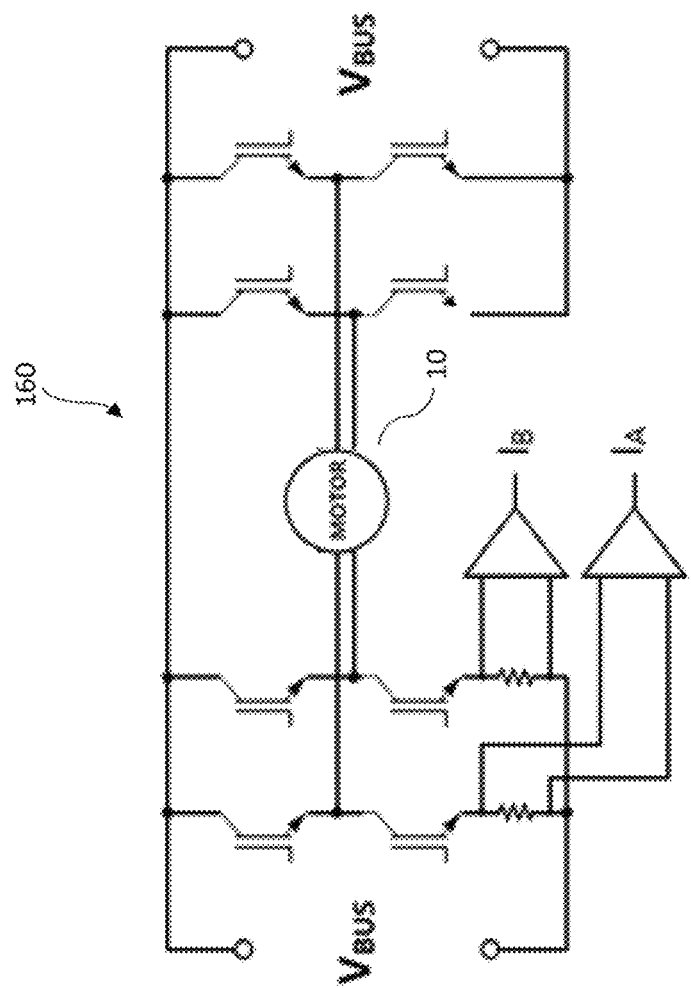
FIG. 17 is a schematic block diagram of a power stage for the closed-loop motor control system in accordance with the invention for the synchronous motor of FIG. 16.
Figure 16:
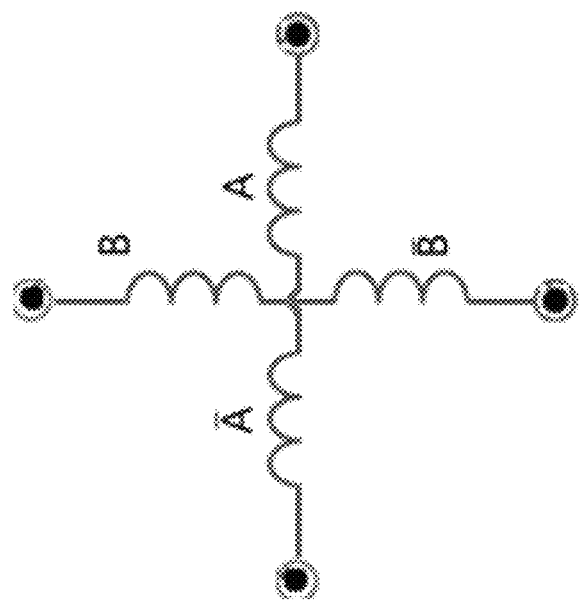
FIG. 16 is a schematic diagram showing a four-wire configuration of stator windings of a synchronous motor in which the closed-loop start-up method in accordance with the invention can be implemented.

FIG. 16 provides a schematic diagram showing a four-wire configuration of 2-phase stator windings 18 of the synchronous motor 10 in which the closed-loop start-up method in accordance with the invention can be implemented. FIG. 17 provides a schematic block diagram of a power stage/bridge 160 for the closed-loop motor controller 100/200 in which the sensed currents "$I_A$", "$I_B$" are fed into the Clarke Transform module 170.

Described are methods of controlling operation of a synchronous motor in a flux weakening mode. One such method comprises, during constant power/speed motor operation, determining a value of a stator voltage ($v_s^2$) for an orthogonal rotating reference frame of the motor. Comparing the value of the determined stator voltage ($v_s^2$) to a threshold voltage ($v_{s\_max1}^2$), said threshold voltage ($v_{s\_max1}^2$) having a value between that of a maximum stator voltage ($v_{s\_max0}^2$) for a basic speed mode of operation of the motor and that of a maximum stator voltage ($v_{s\_max2}^2$) of the motor closed loop controller. If the determined value of the stator voltage ($v_s^2$) is greater than or equal to the value of the threshold voltage ($v_{s\_max1}^2$), then controlling operation of the motor in a flux weakening mode of operation until a value of a current component ($i_d$–$\Delta i_d$) in a d-axis reaches a maximum negative value (−$i_{dmax}$), or until the value of the stator voltage ($v_s^2$) is less than the value of the threshold voltage ($v_{s\_max1}^2$).

The invention also provides a closed-loop controller for a motor, said controller comprising a non-transitory computer-readable medium storing machine-readable instructions and a processor, wherein, when the machine-readable instructions are executed by said processor, they configure the controller to start a synchronous motor having a permanent magnet rotor and stator windings in accordance with any of the methods of the first to third main aspects of the invention.

The invention also provides a synchronous motor including the closed loop controller of the preceding paragraph.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine-readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of controlling operation of a synchronous motor using a closed loop controller, the method comprising:

during constant power or constant speed motor operation, determining a value of a stator voltage ($v_s^2$) for an orthogonal rotating reference frame of the motor;

comparing the value of the determined stator voltage ($v_s^2$) to a threshold voltage ($v_{s\_max1}^2$) in the orthogonal rotating reference frame, said threshold voltage ($v_{s\_max1}^2$) having a predetermined, selected, or calculated value between a value of a maximum stator voltage ($v_{s\_max0}^2$) in the orthogonal rotating reference frame for a basic speed mode of operation of the motor and a value of a maximum stator voltage ($v_{s\_max2}^2$) of the motor closed loop controller;

wherein, if the determined value of the stator voltage ($v_s^2$) is greater than or equal to the value of the threshold voltage ($v_{s\_max1}^2$), then controlling operation of the motor in a flux weakening mode of operation to cause a value of a current component ($i_d - \Delta i_d$) in a d-axis of the orthogonal rotating reference frame to reduce below a value of the current component ($i_d$) in said d-axis for the basic speed mode of operation of the motor until the value of the current component ($i_d - \Delta i_d$) reaches a maximum negative value ($-i_{dmax}$), or until the value of the stator voltage ($v_s^2$) is less than the value of the threshold voltage ($v_{s\_max1}^2$); and wherein, if the determined value of the stator voltage ($v_s^2$) becomes greater than or equal to the value of the maximum stator voltage ($v_{s\_max2}^2$) of the motor closed loop controller, then controlling operation of the motor to cause a value ($v_q'$) of a voltage component in a q-axis of the orthogonal rotating reference frame to have a value derived from a difference between the value of the maximum stator voltage ($v_{s\_max2}^2$) of the motor closed loop controller and a value ($v_d^2$) of a voltage component in the d-axis of the orthogonal rotating reference frame.

2. The method of claim 1, wherein the method includes determining values of stator voltage components ($v_d^2$, $v_q^2$) in both the d-axis and the q-axis of the orthogonal rotating reference frame when determining the value of said stator voltage ($v_s^2$) where $v_s^2 = v_d^2 + v_q^2$.

3. The method of claim 1, wherein, if the determined value of the stator voltage ($v_s^2$) becomes less than the value of the maximum stator voltage ($v_{s\_max0}^2$) for the basic speed mode of operation of the motor, then stopping the flux weakening mode of operation and controlling operation of the motor to cause a value of the current component ($i_d + \Delta i_d$) in the d-axis to increase until it reaches the value of the current component ($i_d$) in the d-axis for the basic speed mode of operation of the motor.

4. The method of claim 1, wherein the value of the voltage component ($v_q'$) in the q-axis is determined from:

$$v_q' = \sqrt{Vs^2\_\max2 - v_d^2}.$$

5. A method of controlling operation of a synchronous motor using a closed loop controller, the method comprising:

during constant power motor operation, determining a value of a stator voltage ($v_s^2$) for an orthogonal rotating reference frame of the motor;

comparing the value of the determined stator voltage ($v_s^2$) to a threshold voltage ($v_{s\_max1}^2$) in the orthogonal rotating reference frame, said threshold voltage ($v_{s\_max1}^2$) having a predetermined, selected, or calculated value between a value of a maximum stator voltage ($v_{s\_max0}^2$) in the orthogonal rotating reference frame for a basic speed mode of operation of the motor and a value of a maximum stator voltage ($v_{s\_max2}^2$) of the motor closed loop controller;

wherein, if the determined value of the stator voltage ($v_s^2$) is greater than or equal to the value of the threshold voltage ($V_{s\_max1}^2$), then controlling operation of the motor in a flux weakening mode of operation until a value of a current component (Target_$i_d$) in a d-axis of the orthogonal rotating reference frame reaches a maximum negative value ($-i_{dmax}$) of the current component in the d-axis, or, if the determined value of the stator voltage ($v_s^2$) is greater than or equal to the value of the threshold voltage ($v_{s\_max1}^2$) and if a target value of the stator current (Target_$i_s$) less a value of a current component ($i_q^2$) in a q-axis is less than a maximum value ($i_{dmax}$) of the current component in the d-axis, then controlling operation of the motor in a flux weakening mode of operation by reducing a value of the current component (Target_$i_d$) in the d-axis based on the target value of the stator current (Target_$i_s$) less the value of the current component ($i_q^2$) in the q-axis; and wherein the method includes determining values of the target stator current (Target_$i_s$) based on the equation:

$$\text{Target\_}i s^2 = i_s^2 = i_q^2 + i_d^2 \leq i_{s\,max}^2.$$

6. The method of claim 5, wherein, in the flux weakening mode of operation, the value of the current component (Target_$i_d$) in the d-axis is reduced according to the equation:

$$\text{Target\_}i_d = -\sqrt{\text{Target\_}is^2 - ipf(i_q)^2}.$$

7. The method of claim 5, wherein the method includes determining values of stator voltage components ($v_d^2$, $v_q^2$) in both the d-axis and a q-axis of the orthogonal rotating reference frame when determining the value of said stator voltage ($v_s^2$) where $v_s^2 = v_d^2 + v_q^2$.

8. The method of claim 5, wherein, if the determined value of the stator voltage ($v_s^2$) is greater than or equal to the value of the maximum stator voltage ($v_{s\_max2}^2$) of the motor closed loop controller, then controlling operation of the motor to cause a value ($v_q'$) of a voltage component in the q-axis of the orthogonal rotating reference frame to have a value derived from a difference between the value of the maximum stator voltage ($v_{s\_max2}^2$) of the motor closed loop controller and a value ($v_d^2$) of a voltage component in the d-axis of the orthogonal rotating reference frame.

9. The method of claim 8, wherein the value of the voltage component ($v_q'$) in the q-axis is determined from:

$$v_q' = \sqrt{Vs^2\_\text{max2} - v_d^2}.$$

10. The method of claim 5, wherein, if the determined value of the stator voltage ($v_s^2$) is greater than or equal to the value of the maximum stator voltage ($v_{s\_max2}^2$) of the motor closed loop controller, then controlling operation of the motor to cause a value ($v_q'$) of a voltage component in the q-axis of the orthogonal rotating reference frame to have a value equal to a value of the voltage component ($v_q$) in the q-axis for the basic speed mode of operation of the motor.

11. A method of controlling operation of a synchronous motor using a closed loop controller, the method comprising:
during a flux weakening mode of operation of the motor, controlling a value of a stator current component (Target_$i_d$) in a d-axis of an orthogonal rotating reference frame of the motor by selecting a target value of the stator current component (Target_$i_d$) in the d-axis from a look-up table by reference to motor speed (Fw_speed) values, wherein the look-up table values are obtained by measuring motor speed and corresponding values of the stator current component in the d-axis for a plurality of motor voltage supply values;
wherein the method includes linear approximation of a selected pair of motor speed (Fw_speed) value and stator current component (Target_$i_d$) value.

12. The method of claim 11, wherein the method includes determining a value of a stator voltage ($v_s^2$) for the orthogonal rotating reference frame of the motor and, if the determined value of the stator voltage ($v_s^2$) is greater than or equal to a value of the maximum stator voltage ($v_{s\_max2}^2$) of the motor closed loop controller, then controlling operation of the motor to cause a value ($v_q'$) of a voltage component in a q-axis of the orthogonal rotating reference frame to have a value derived from a difference between the value of the maximum stator voltage ($v_{s\_max2}^2$) of the motor closed loop controller and a value ($v_d^2$) of a voltage component in the d-axis of the orthogonal rotating reference frame.

13. The method of claim 12, wherein the value of the voltage component ($v_q'$) in the q-axis is determined from:

$$v_q' = \sqrt{Vs^2\_\text{max2} - v_d^2}.$$

14. The method of claim 11, wherein the method includes determining a value of a stator voltage ($v_s^2$) for the orthogonal rotating reference frame of the motor and, if the determined value of the stator voltage ($v_s^2$) is greater than or equal to the value of the maximum stator voltage ($v_{s\_max2}^2$) of the motor closed loop controller, then controlling operation of the motor to cause a value ($v_q'$) of a voltage component in the q-axis of the orthogonal rotating reference frame to have a value equal to a value of the voltage component ($v_q$) in the q-axis for the basic speed mode of operation of the motor.

15. The method of claim 11, wherein the method includes determining values of stator voltage components ($v_d^2$, $v_q^2$) in both the d-axis and a q-axis of the orthogonal rotating reference frame when determining the value of said stator voltage ($v_s^2$) where $v_s^2 = v_d^2 + v_q^2$.

16. A method of controlling operation of a synchronous motor using a closed loop controller, the method comprising:
during constant power or constant speed motor operation, determining a value of a stator voltage ($v_s^2$) for an orthogonal rotating reference frame of the motor;
comparing the value of the determined stator voltage ($v_s^2$) to a threshold voltage ($v_{s\_max1}^2$) in the orthogonal rotating reference frame, said threshold voltage ($v_{s\_max1}^2$) having a predetermined, selected, or calculated value between a value of a maximum stator voltage ($v_{s\_max0}^2$) in the orthogonal rotating reference frame for a basic speed mode of operation of the motor and a value of a maximum stator voltage ($v_{s\_max2}^2$) of the motor closed loop controller;
wherein, if the determined value of the stator voltage ($v_s^2$) is greater than or equal to the value of the threshold voltage ($v_{s\_max1}^2$), then controlling operation of the motor in a flux weakening mode of operation until a value of a current component ($i_d - \Delta i_d$) in a d-axis of the orthogonal rotating reference frame reaches a maximum negative value ($-i_{dmax}$), or until the value of the stator voltage ($v_s^2$) is less than the value of the threshold voltage ($v_{s\_max1}^2$); and
wherein, if the determined value of the stator voltage ($v_s^2$) becomes greater than or equal to the value of the maximum stator voltage ($v_{s\_max2}^2$) of the motor closed loop controller, then controlling operation of the motor to cause a value ($v_d'$) of a voltage component in a q-axis of the orthogonal rotating reference frame to have a value equal to a value of the voltage component ($v_q$) in the q-axis for the basic speed mode of operation of the motor.

17. A method of controlling operation of a synchronous motor using a closed loop controller, the method comprising:
during constant power or constant speed motor operation, determining a value of a stator voltage ($v_s^2$) for an orthogonal rotating reference frame of the motor;
comparing the value of the determined stator voltage ($v_s^2$) to a threshold voltage ($v_{s\_max1}^2$) in the orthogonal rotating reference frame, said threshold voltage ($v_{s\_max1}^2$) having a predetermined, selected, or calculated value between a value of a maximum stator voltage ($v_{s\_max0}^2$) in the orthogonal rotating reference frame for a basic speed mode of operation of the motor and a value of a maximum stator voltage ($v_{s\_max2}^2$) of the motor closed loop controller;

wherein, if the determined value of the stator voltage ($v_s^2$) is greater than or equal to the value of the threshold voltage ($v_{s\_max1}^2$), then controlling operation of the motor in a flux weakening mode of operation to cause a value of a current component ($i_d - \Delta i_d$) in a d-axis of the orthogonal rotating reference frame to reduce below a value of the current component ($i_d$) in said d-axis for the basic speed mode of operation of the motor until the value of the current component ($i_d - \Delta i_d$) reaches a maximum negative value ($-i_{dmax}$), or until the value of the stator voltage ($v_s^2$) is less than the value of the threshold voltage ($v_{s\_max1}^2$); and wherein, if the determined value of the stator voltage ($v_s^2$) becomes less than the value of the maximum stator voltage ($v_{s\_max0}^2$) for the basic speed mode of operation of the motor, then stopping the flux weakening mode of operation and controlling operation of the motor to cause a value of the current component ($i_d + \Delta i_d$) in the d-axis to increase until it reaches the value of the current component ($i_d$) in the d-axis for the basic speed mode of operation of the motor.

18. A method of controlling operation of a synchronous motor using a closed loop controller, the method comprising:

during constant power motor operation, determining a value of a stator voltage ($v_s^2$) for an orthogonal rotating reference frame of the motor;

comparing the value of the determined stator voltage ($v_s^2$) to a threshold voltage ($v_{s\_max1}^2$) in the orthogonal rotating reference frame, said threshold voltage ($v_{s\_max1}^2$) having a predetermined, selected, or calculated value between a value of a maximum stator voltage ($v_{s\_max0}^2$) in the orthogonal rotating reference frame for a basic speed mode of operation of the motor and a value of a maximum stator voltage ($v_{s\_max2}^2$) of the motor closed loop controller;

wherein, if the determined value of the stator voltage ($v_s^2$) is greater than or equal to the value of the threshold voltage ($v_{s\_max1}^2$), then controlling operation of the motor in a flux weakening mode of operation until a value of a current component (Target_$i_d$) in a d-axis of the orthogonal rotating reference frame reaches a maximum negative value ($-i_{dmax}$) of the current component in the d-axis, or, if the determined value of the stator voltage ($v_s^2$) is greater than or equal to the value of the threshold voltage ($v_{s\_max1}^2$) and if a target value of the stator current (Target_$i_s$) less a value of a current component ($i_q^2$) in a q-axis is less than a maximum value ($i_{dmax}$) of the current component in the d-axis, then controlling operation of the motor in a flux weakening mode of operation by reducing a value of the current component (Target_$i_d$) in the d-axis based on the target value of the stator current (Target_$i_s$) less the value of the current component ($i_q^2$) in the q-axis; and wherein, if the determined value of the stator voltage ($v_s^2$) is greater than or equal to the value of the maximum stator voltage ($V_{s\_max2}^2$) of the motor closed loop controller, then controlling operation of the motor to cause a value ($v_q'$) of a voltage component in the q-axis of the orthogonal rotating reference frame to have a value equal to a value of the voltage component ($v_q$) in the q-axis for the basic speed mode of operation of the motor.

19. A method of controlling operation of a synchronous motor using a closed loop controller, the method comprising:

during a flux weakening mode of operation of the motor, controlling a value of a stator current component (Target_$i_d$) in a d-axis of an orthogonal rotating reference frame of the motor by selecting a target value of the stator current component (Target_$i_d$) in the d-axis from a look-up table by reference to motor speed (Fw_speed) values, wherein the look-up table values are obtained by measuring motor speed and corresponding values of the stator current component in the d-axis for a plurality of motor voltage supply values;

wherein the method includes determining a value of a stator voltage ($v_s^2$) for the orthogonal rotating reference frame of the motor and, if the determined value of the stator voltage ($v_s^2$) is greater than or equal to the value of the maximum stator voltage ($v_{s\_max2}^2$) of the motor closed loop controller, then controlling operation of the motor to cause a value ($v_q'$) of a voltage component in the q-axis of the orthogonal rotating reference frame to have a value equal to a value of the voltage component ($v_q$) in the q-axis for the basic speed mode of operation of the motor.

* * * * *

UNITED STATES PATENT AND TRADEMARK OFFICE
CERTIFICATE OF CORRECTION

PATENT NO. : 11,677,346 B2
APPLICATION NO. : 17/462885
DATED : June 13, 2023
INVENTOR(S) : Kwei Chung Li and Feng Zhu It is certified that error appears in the above-identified patent and that said Letters Patent is hereby corrected as shown below:

In the Claims

In Claim 2, Column 20, Line 19, "voltage ($v_s^2$) where $v_s^2 = v_d^2 + v_d^2$." should read -- voltage ($v_s^2$) where $v_s^2 = v_d^2 + V_q^2$. --

In Claim 6, Column 21, Lines 10-11, "$Target\_id = -\sqrt{Target\_i_s^2 - lpf(i_q)^2}$." should read -- $Target\_id = -\sqrt{Target\_i_s^2 - lpf(i_q)^2}$. --

In Claim 15, Column 22, Line 19 "voltage ($v_s^2$) where $v_s^2 = v_d^2 + v_d^2$." should read -- voltage ($v_s^2$) where $v_s^2 = v_d^2 + v_q^2$. --

In Claim 16, Column 22, Line 48, "to cause a value ($v_d'$) of a voltage component in a q-axis" should read -- to cause a value ($v_q'$) of a voltage component in a q-axis --

Signed and Sealed this
Twenty-second Day of August, 2023

Katherine Kelly Vidal
*Director of the United States Patent and Trademark Office*